(12) United States Patent
Fu et al.

(10) Patent No.: US 12,356,489 B2
(45) Date of Patent: Jul. 8, 2025

(54) KEEP-ALIVE PROCEDURE FOR SIDELINK

(71) Applicant: Telefonaktiebolaget LM Ericsson (publ), Stockholm (SE)

(72) Inventors: Zhang Fu, Stockholm (SE); Congchi Zhang, Aachen (DE); Antonino Orsino, Kirkkonummi (FI); Shabnam Sultana, Montreal (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 374 days.

(21) Appl. No.: 17/786,244

(22) PCT Filed: Oct. 12, 2020

(86) PCT No.: PCT/EP2020/078578
§ 371 (c)(1),
(2) Date: Jun. 16, 2022

(87) PCT Pub. No.: WO2021/121705
PCT Pub. Date: Jun. 24, 2021

(65) Prior Publication Data
US 2023/0063048 A1 Mar. 2, 2023

Related U.S. Application Data

(60) Provisional application No. 62/951,056, filed on Dec. 20, 2019.

(51) Int. Cl.
*H04W 76/25* (2018.01)
*H04L 1/1812* (2023.01)
(Continued)

(52) U.S. Cl.
CPC ........... *H04W 76/25* (2018.02); *H04L 1/1812* (2013.01); *H04W 76/38* (2018.02); *H04W 92/18* (2013.01)

(58) Field of Classification Search
CPC ..... H04W 76/25; H04W 76/38; H04W 76/14; H04W 92/18; H04W 4/40; H04L 1/1812
See application file for complete search history.

(56) References Cited

U.S. PATENT DOCUMENTS

| 2007/0274233 A1* | 11/2007 | Ptashek .................. H04L 67/306 |
| | | 370/254 |
| 2019/0082495 A1* | 3/2019 | Kim ...................... H04W 76/38 |
| 2020/0100088 A1 | 3/2020 | Kim et al. |

FOREIGN PATENT DOCUMENTS

WO 2018128505 A1 7/2018

OTHER PUBLICATIONS

International Search Report and Written Opinion dated Jan. 25, 2021 for International Application No. PCT/EP2020/078578 filed Oct. 12, 2020, consisting of 10-pages.
(Continued)

*Primary Examiner* — Jamal Javaid
(74) *Attorney, Agent, or Firm* — Weisberg I.P. Law, P.A.

(57) ABSTRACT

A method performed by a first user equipment (UE) configured for device-to-device (D2D) wireless communication. The method includes starting a keep-alive timer associated with a unicast sidelink (SL) connection with a second UE configured for D2D wireless communication. In response to expiration of the keep-alive timer, without receiving a transmission from the second UE while the keep-alive timer was running, a keep-alive message is transmitted to the second UE. In response to not receiving an acknowledgement of the keep-alive message, from the second UE within a predetermined duration, release of the unicast SL connection with the second UE is initiated without transmitting a further keep-alive message to the second UE.

16 Claims, 15 Drawing Sheets

(51) Int. Cl.
*H04W 76/38* (2018.01)
*H04W 92/18* (2009.01)

(56) References Cited

OTHER PUBLICATIONS

3GPP TS 24.334 V15.2.0; 3rd Generation Partnership Project; Technical Specification Group Core Network and Terminals; Proximity-services (ProSe) User equipment (UE) to ProSe function protocol aspects; Stage 3 (Release 15); Sep. 2018, consisting of 264-pages.
3GPP TS 23.285 V15.2.0; 3rd Generation Partnership Project; Technical Specification Group Services and System Aspects; Architecture enhancements for V2X services; (Release 15); Dec. 2018, consisting of 37-pages.
3GPP TS 23.287 V16.0.0; 3rd Generation Partnership Project; Technical Specification Group Services and System Aspects; Architecture enhancements for 5G System (5GS) to support Vehicle-to-Everything (V2X) services; (Release 16); Sep. 2019, consisting of 49-pages.
3GPP TS 23.501 V16.0.1; 3rd Generation Partnership Project; Technical Specification Group Services and System Aspects; System Architecture for the 5G System; Stage 2 (Release 16); Apr. 2019, consisting of 317-pages.
3GPP TS 33.401 V15.6.0; 3rd Generation Partnership Project; Technical Specification Group Services and System Aspects; 3GPP System Architecture Evolution (SAE); Security architecture; (Release 15); Dec. 2018, consisting of 163-pages.
3GPP TR 38.801 V14.0.0; 3rd Generation Partnership Project; Technical Specification Group Radio Access Network; Study on new radio access technology: Radio access architecture and interfaces (Release 14); Mar. 2017, consisting pf 91-pages.

\* cited by examiner

KEEP-ALIVE PROCEDURE FOR SIDELINK

CROSS-REFERENCE TO RELATED APPLICATIONS

This application is a Submission Under 35 U.S.C. § 371 for U.S. National Stage Patent Application of International Application No.: PCT/EP2020/078578, filed Oct. 12, 2020 entitled "KEEP-ALIVE PROCEDURE FOR SIDELINK," which claims priority to U. S. Provisional Application No.: 62/951,056, filed Dec. 20, 2019, entitled "KEEP-ALIVE PROCEDURE FOR NR SIDELINK," the entireties of both of which are incorporated herein by reference.

TECHNICAL FIELD

The present application relates generally to the field of wireless communications, and more specifically to intelligent transportation system (ITS) and/or vehicle-to-everything (V2X) services using device-to-device (D2D) communications.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objectives, features and advantages of the enclosed embodiments will be apparent from the following description.

Cellular communication systems are currently being developed and improved for Cooperative Intelligent Transportation Systems (C-ITS) applications, including road transport. Communication of vehicles with each other (vehicle-to-vehicle, or V2V), with infrastructure (V2I), and with vulnerable pedestrians (V2P) are expected to increase user safety and comfort, and to improve traffic management and/or reduce congestion, and to reduce vehicle fuel consumption and emissions. Collectively, these communication modes are commonly referred to as vehicle to everything (V2X). An extensive set of C-ITS use cases for V2X have been developed, and, based on these use cases, V2X communication requirements have been developed.

Within these use cases, the end-user communication equipment is commonly referred to as a user equipment (UE or, more specifically, V2X UE), and the entity serving an application associated with a use case is commonly referred to as an application server (more specifically, V2X AS). For example, FIG. 1 shows a simplified architectural model for the V2X application layer as specified in Third Generation Partnership Project (3GPP) Technical Standard (TS) 23.285. In FIG. 1, the V2X UE1 communicates with V2X application server (AS) over V1 reference point, and the V2X UE1 and UE2 communicate over V5 reference point. In addition, V2X UE1 can act as a UE-to-network relay thereby enabling V2X UE2 to access the V2X application server over V1 reference point.

Furthermore, reference point V1 supports the V2X application-related interactions between V2X UE and V2X AS and is further specified in 3GPP TS 23.285. This reference point is supported for both unicast and multicast delivery modes. Likewise, reference point V5 supports the interactions between the V2X UEs and is also specified in 3GPP TS 23.285.

Depending on the particular application, V2X and/or ITS messages may carry both safety-related and non-safety-related information. Moreover, each of the applications and services may be associated with specific requirements, e.g., latency, reliability, capacity, etc. European Telecommunication Standards Institute (ETSI) has defined two types of messages for road safety: Co-operative Awareness Message (CAM) and Decentralized Environmental Notification Message (DENM).

A V2X UE can support unicast communication via the radio interface (also referred to as "Uu") to a 3GPP radio access network (RAN), such as the Long Term Evolution (LTE) Evolved Universal Mobile Telecommunications System Terrestrial Radio Access Network (E-UTRAN) or Next-Generation RAN (NG-RAN). A V2X UE can also support unicast over the PC5 interface, whereby UEs can communicate with each other directly via sidelink (SL) rather than indirectly via uplink (UL) and downlink (DL) with the 3GPP RAN.

The first 3GPP standardization of SL communications was in Long-Term Evolution (LTE, also referred to as 4G) Release 12 (Rel-12), targeting public safety use cases. Since then, a number of enhancements have been introduced to broaden the use cases that could benefit from D2D technology. In Rel-14 and Rel-15, LTE was extended to include support device-to-device (D2D) SL features targeting vehicular communications, which are collectively referred to as V2X as mentioned above. FIG. 2 illustrates an exemplary network arrangement supporting V2X scenarios by LTE UL, DL, and SL.

SL allows D2D UEs to establish a communication when in 3GPP network coverage (InC), out of network coverage (OOC), and in partial coverage situations when one D2D UEs is InC but the other is OOC. When operated InC or in partial coverage, the network may exercise various degrees of control over behavior of the UEs communicating via SL.

FIG. 2 shows two exemplary InC D2D scenarios. In particular, FIG. 2A shows an exemplary scenario in which UE1 and UE2 are in D2D communication via SL (e.g., via PC5) and also maintain respective links (e.g., via Uu) with a common serving network node. In FIG. 2A, UE1 transmits signals to UE2 on the SL labelled L12, and UE2 transmits signals to UE1 on the SL labeled L21. UE1 and UE2 also communicate with the base station via bidirectional (i.e., UL/DL) cellular radio links, respectively N1 and N2.

FIG. 2B shows an exemplary scenario similar to the one shown in FIG. 2A, with the addition of a third UE, UE3, that is in D2D communication with UE1 via SL. In FIG. 2B, UE1 transmits signal to UE3 on the SL labeled L13, while UE3 transmits signals to UE1 on the SL labeled L31. UE3 also maintains UL/DL communication (via Uu) with the network node (e.g., BS). UE3 also communicates with the same base station as UE1 and UE2 via a bidirectional cellular radio link, N3. In other variants of the scenario shown in FIG. 2B, any of UE1, UE2, and UE3 can have a cellular link with a different base station than one or more of the others.

FIGS. 3A and 3B show variants of FIGS. 2A and 2B, respectively, in which each of UE1, UE2, and UE3 is configured for D2D communication with one or more of the others, but all are OOC with respect to the network. In a partial coverage variant of the scenarios shown in FIGS. 2-3, any of UE1, UE2, and UE3 can be in network coverage while the others are outside of coverage.

FIG. 4 shows a high-level view of an exemplary C-ITS environment in which various V2X communications can be employed. At the bottom of FIG. 4, the two left-most users are conventional communication devices (also referred to as "user equipment" or UE, for short) that communicate only via the mobile network(s) shown in the middle layer. In contrast, the right-most user is only capable of D2D communications via V2X SL, such as with other nearby users having compatible V2X SL/D2D capabilities. However, the middle two users are capable of communicating both via the mobile network(s) in the middle layer, as well as directly with other nearby users having compatible V2X SL/D2D capabilities.

Resources for UE V2X SL communication can be configured on a dedicated C-ITS carrier (e.g., in a dedicated ITS band) or on a carrier of the UE's serving cell provided by a 3GPP RAN (e.g., in licensed cellular band). In the latter case, the serving cell's time/frequency resources must be shared by conventional cellular communication (over Uu) and D2D SL communication (over PC5). For example, SL resources can be time-multiplexed with serving cell UL resources used for cellular communication.

Broadcast, groupcast, and unicast transmissions for V2X SL operation are supported for the InC, OOC, and partial-coverage scenarios. For unicast and groupcast SL transmissions, hybrid automatic repeat request (such as ARQ or HARQ), e.g. acknowledgement (ACK) or negative acknowledgement (NAK), feedback and HARQ combining are supported in the UE physical layer (PHY).

While LTE was primarily designed for user-to-user communications, Fifth Generation (5G, which may also be referred to as New Radio, NR) cellular networks are envisioned to support both high single-user data rates (e.g., 1 Gb/s) and large-scale, machine-to-machine communication involving short, bursty transmissions from many different devices that share the frequency bandwidth. The 5G radio standards (also referred to as "New Radio" or "NR") are currently targeting a wide range of data services including eMBB (enhanced Mobile Broad Band), URLLC (Ultra-Reliable Low Latency Communication), and Machine-Type Communications (MTC). These services can have different requirements and objectives.

While LTE V2X was primarily targeted at traffic safety services, NR V2X has a much broader scope including not only basic safety services but also non-safety applications such as sensor/data sharing between vehicles, with the objective to strengthen the user's or vehicle's perception of the surrounding environment. This enhanced SL framework can facilitate new applications, such as vehicles platooning, cooperative maneuver between vehicles, remote/autonomous driving, etc.

Even so, such new applications place more strict requirements on data rate, capacity, reliability, latency, communication range, and/or speed. For example, given the variety of services that can be transmitted over SL, a robust quality of service (QoS) framework, which takes into account the different performance requirements of the different V2X services, may be needed. Additionally, new radio protocols that are more robust and reliable may be needed.

To maintain reliable unicast operation between any two UEs engaged in SL/D2D operation, each UE must perform radio link monitoring (RLM) of the signals transmitted by other UE. In LTE D2D communication, a PC5-S keep-alive procedure is used to monitor the link quality, as defined in 3GPP TS 24.334. Basically, the requesting UE manages a keep-alive timer T4102 and a keep-alive counter for this procedure. On expiration of the timer, the UE sends a keep-alive message to its peer UE on the SL, with the message including the current value of the keep-alive counter.

For various reasons, however, reuse of this LTE keep-alive procedure for NR SL/D2D operation creates various issues and/or problems, such that it is not preferred. As such, there is a need for an improved keep-alive procedure for NR SL/D2D operation.

SUMMARY

Accordingly, exemplary embodiments of the present disclosure address these and other difficulties relating to keep-alive procedures for NR SL/D2D operation, thereby enabling the otherwise-advantageous deployment of D2D UEs with NR networks.

Exemplary embodiments of the present disclosure include methods (e.g., procedures) performed by a first user equipment (UE) configured for device-to-device (D2D) wireless communication. For example, the first UE can be a transmitting UE (also referred to herein as "UE1"), as described in more detail below.

In some embodiments, these exemplary methods can comprise sending, to a second UE configured for D2D wireless communication, a configuration message comprising an indicator of whether the second UE is expected to respond to a keep-alive message, from the first UE, with an acknowledgement. The configuration message can be sent over an existing unicast SL connection between the first UE and the second UE, or during setup of such a unicast SL connection.

In some embodiments, these exemplary methods can also determining one or more timer values based on one or more services running over the unicast SL connection. Each determined timer value can be applied when the first UE starts a keep-alive timer or a release timer associated with the unicast SL connection.

In some embodiments, these exemplary methods can also include receiving a first transmission from the second UE via the unicast SL connection. These exemplary methods can also include starting a keep-alive timer associated with unicast SL connection. In some embodiments, the keep-alive timer can be started in response to receiving the first transmission. In some embodiments, one of the determined timer values can be applied when starting the keep-alive timer. In various embodiments, the first transmission can be one or more of the following: a PC5 signaling message; user data on physical sidelink shared channel (PSSCH); sidelink control information (SCI) on physical sidelink control channel (PSCCH); acknowledgement or negative acknowledgement (ACK or NACK) hybrid automatic repeat request (e.g. ARQ or HARQ) feedback on physical (PHY) and/or media access control (MAC) layers; and acknowledgement or negative acknowledgement (ACK or NACK) feedback on a radio link control (RLC) layer.

In some embodiments, these exemplary methods can also include restarting the keep-alive timer in response to receiving a second transmission, from the second UE, while the keep-alive timer was running. For example, the second transmission can be any of the types of transmissions discussed above in relation to the first transmission.

These exemplary methods can also include, in response to expiration of the keep-alive timer without receiving a transmission from the second UE while the keep-alive timer was running, transmitting a keep-alive message to the second UE. In some embodiments, these exemplary methods can also include, in response to transmitting the keep-alive message to the second UE, starting a release timer associated with the unicast SL connection. For example, one of the determined timer values can be applied when starting the release timer.

In some embodiments, these exemplary methods can also include stopping the release timer and restarting the keep-alive timer in response to receiving a second transmission, from the second UE, while the release timer was running. In some embodiments, these exemplary methods can also include, in response to a radio link failure (RLF) condition while at least one of the keep-alive timer and the release timer is running, stopping at least one of the keep-alive timer and the release timer and initiating release of the unicast SL connection. For example, such operations can be performed upon occurrence of a RLF due to a problem not related to the keep-alive signaling.

These exemplary methods can also include, in response to not receiving an acknowledgement of the keep-alive message from the second UE within a predetermined duration, initiating release of the unicast SL connection with the second UE without transmitting a further keep-alive message to the second UE. In some embodiments, the predetermined duration is upon expiration of the release timer, e.g., if the release timer was previously started and is allowed to run until expiration.

In some embodiments, these exemplary methods can also include releasing the unicast SL connection with the second UE without transmitting a connection release message to the second UE. For example, the first UE can perform this operation when channel conditions of the unicast SL connection indicate that the second UE would not receive such a message.

Other exemplary embodiments of the present disclosure include methods (e.g., procedures) performed by a second user equipment (UE) configured for device-to-device (D2D) wireless communication. For example, the second UE can be a receiving UE (also referred to herein as "UE2"), as described in more detail below.

In some embodiments, these exemplary methods can include receiving, from a second UE configured for D2D wireless communication, a configuration message comprising an indicator of whether the second UE is expected to respond to a keep-alive message, from the first UE, with an acknowledgement. The configuration message can be received over an existing unicast SL connection between the first UE and the second UE, or during setup of such a unicast SL connection.

In some embodiments, these exemplary methods can also include transmitting a first transmission to the first UE via the unicast SL connection. In various embodiments, the first transmission can be one or more of the following: a PC5 signaling message; user data on physical sidelink shared channel (PSSCH); sidelink control information (SCI) on physical sidelink control channel (PSCCH); acknowledgement or negative acknowledgement (ACK or NACK) hybrid automatic repeat request (e.g. ARQ or HARQ) feedback on physical (PHY) and/or media access control (MAC) layers; and acknowledgement or negative acknowledgement (ACK or NACK) feedback on a radio link control (RLC) layer.

These exemplary methods can also include receiving, from the first UE, a keep-alive message for the unicast SL connection between the first UE and the second UE. For example, the keep-alive message can be received after transmitting the first transmission.

In some embodiments, these exemplary methods can also include, after receiving the keep-alive message, transmitting a second transmission to the first UE via the unicast SL connection. For example, the second transmission can be any of the types of transmissions discussed above in relation to the first transmission.

These exemplary methods can also selectively transmitting, to the first UE, an acknowledgement of the keep-alive message. The selective transmission can be based on one or more of the following: the second UE's need for monitoring the unicast SL connection (e.g., for RLF); channel conditions (e.g., congestion) relating to the unicast SL connection; and whether the first UE expects an acknowledgement of the keep-alive message (e.g., as indicated in a configuration message received earlier). In some embodiments, the second UE may forego transmitting the acknowledgement if it has performed, or will perform, the second transmission.

In some embodiments, these exemplary methods can also include receiving, from the first UE, a connection release message. The connection release message can be received without the second UE receiving a further keep-alive message from the first UE. For example, the connection release message can be received after the UE transmits the acknowledgement or refrains from transmitting the acknowledge, e.g., as part of the selective transmission. In either case, the first UE does not receive an acknowledgement and may send the connection release message without sending a further keep-alive message.

Other exemplary embodiments include user equipment (UEs, e.g., V2X UEs, D2D UEs, wireless devices, etc.) configured to perform operations corresponding to any of the exemplary methods described herein. In some embodiments, a UE configured for D2D wireless communication may be arranged to perform operations corresponding to any of the exemplary methods described herein. In some embodiments, a UE configured for D2D wireless communication may comprise radio interface circuitry configured to communicate with at least one other UE and processing circuitry operably coupled with the radio interface circuitry, whereby the processing circuitry and the radio interface circuitry may be configured to perform operations corresponding to any of the exemplary methods described herein.

Exemplary embodiments also include non-transitory, computer-readable media storing computer-executable instructions that, when executed by processing circuitry of a UE, configure the UE (e.g. configured for device-to-device, D2D, wireless communication) to perform operations corresponding to any of the exemplary methods described herein. In some embodiments, a computer program product may comprise computer-executable instructions that, when executed by processing circuitry of a UE configured for D2D wireless communication, configure the UE to perform operations corresponding to any of the exemplary methods described herein.

These and other objects, features, and advantages of the present disclosure will become apparent upon reading the following Detailed Description in view of the Drawings briefly described below.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

Figure 1:
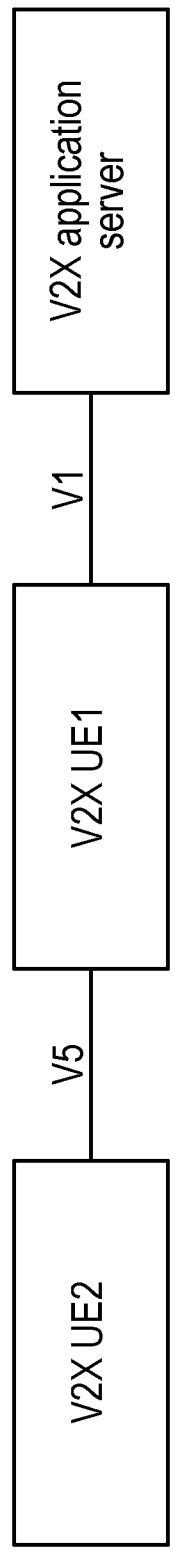
FIG. 1 shows a simplified architectural model for the V2X application layer as specified in 3GPP TS 23.285.
Figure 2:
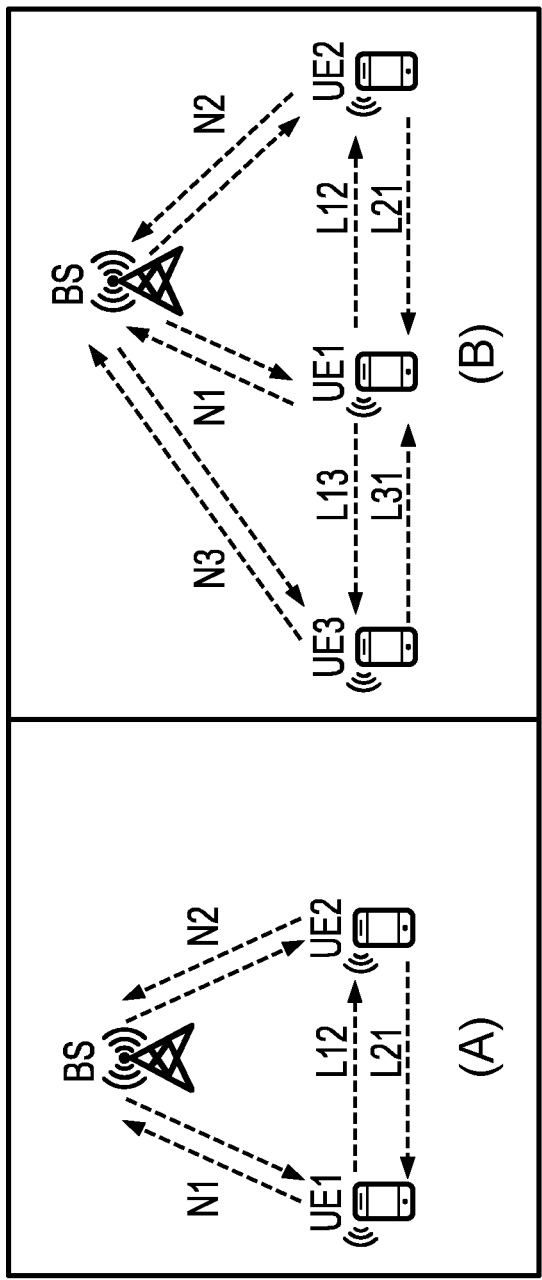
FIGS. 2A-B show exemplary scenarios in which UEs are in D2D communication via SL and also maintain respective links with a common serving network node.
Figure 3:
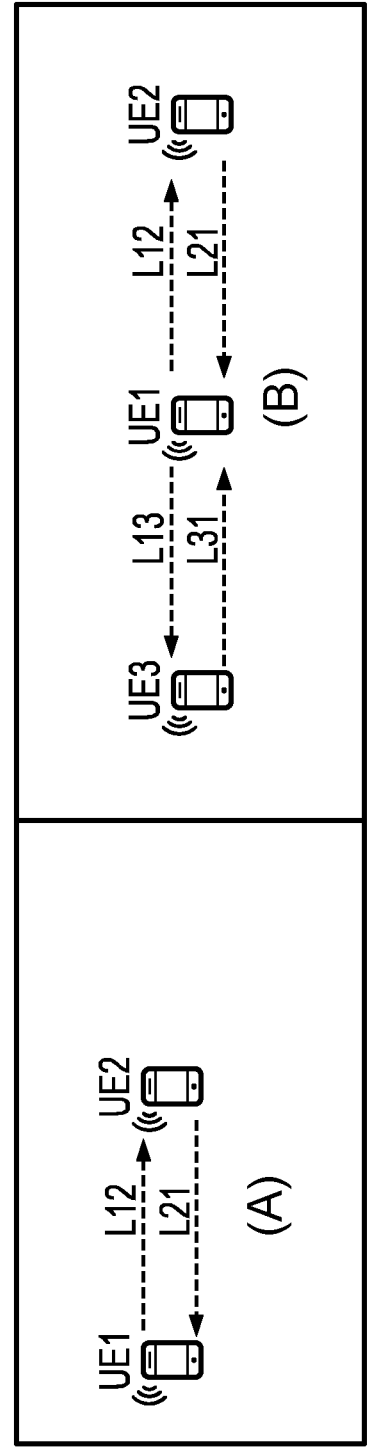
FIGS. 3A-B show exemplary scenarios in which UEs are in D2D communication via SL without links to one or more serving network nodes (e.g., out of coverage)
Figure 4:
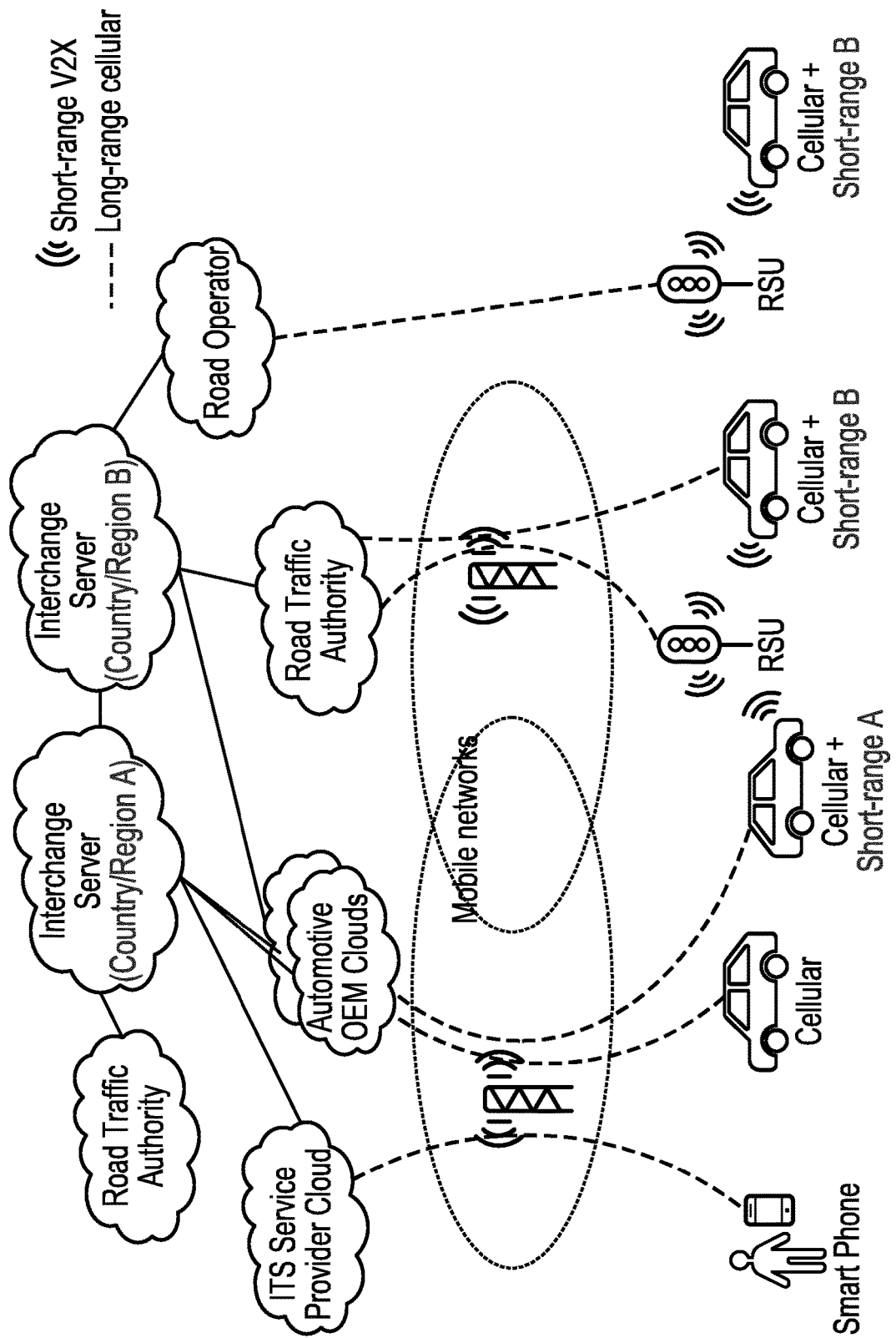
FIG. 4 shows a high-level view of an exemplary C-ITS environment in which various V2X communications can be employed.

Embodiments briefly summarized above will now be described more fully with reference to the accompanying drawings. These descriptions are provided by way of example to explain the subject matter to those skilled in the art, and should not be construed as limiting the scope of the subject matter to only the embodiments described herein. More specifically, examples are provided below that illustrate the operation of various embodiments according to the advantages discussed above. Furthermore, the following terms are used throughout the description given below:

Radio Node: As used herein, a "radio node" can be either a "radio access node" or a "wireless device."

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., centralized unit (CU) and distributed unit (DU)), a high-power or macro base station, a low-power base station (e.g., micro, pico, femto, or home base station, or the like), an integrated access backhaul (IAB) node, a transmission point, a remote radio unit (e.g. a remote radio unit (RRU) or a remote radio head (RRH)), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (AMF), a user plane function (UPF), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Unless otherwise noted, the term "wireless device" is used interchangeably herein with "user equipment" (or "UE" for short). Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Signal: As used herein, a "signal" can be any physical signal or physical channel. Examples of physical signals are reference signal such as primary synchronization signal (PSS), secondary synchronization signal (SSS), channel state information RS (CSI-RS), demodulation RS (DM-RS), signals in SSB, cell reference signal (CRS), positioning reference signal (PRS), sounding reference signal (SRS), etc. The term physical channel used herein is also called as "channel", which contains higher layer information such as logical channel(s), transport channel(s), etc. Examples of physical channels include physical broadcast channel (PBCH), physical SL control channel (PSCCH), physical SL shared channel (PSSCH), physical DL control channel (PDCCH), physical DL shared channel (PDSCH), physical UL shared channel (PUSCH), physical UL control channel (PUCCH), random access channel (RACH), etc.

Resource: As used herein, a "resource" can correspond to any type of physical resource or radio resource expressed in terms of time. Examples of time resources include symbol, time slot, subframe, radio frame, time to interactive (TTI), interleaving time, etc.

Time-frequency resource: As used herein, a "time-frequency resource" can be any radio resource defined in any time-frequency resource grid (e.g., the exemplary NR resource grid shown in FIG. 5) associated with a cell. Examples of time-frequency resource include subcarrier, timeslot, resource block (RB), etc. An RB may also be interchangeably called as physical RB (PRB), virtual RB (VRB), etc.

Link: As used herein, "link" or "radio link" can correspond to a radio transmission path used for cellular operation or for any type of D2D operation between two endpoints (e.g., UEs or wireless devices). Examples of links used for cellular operations are links on Uu interface, uplink/reverse link (UE transmission to BS), downlink/forward link (BS transmission to UE), etc. Examples of links used for D2D operations are links on PC5, sidelink, etc.

Channel: As used herein, a "channel" can be a logical, transport, or physical channel (including exemplary physical channels listed above). A channel may comprise and/or be arranged on one or more carriers, in particular a plurality of subcarriers. A channel carrying and/or for carrying control signaling/control information may be considered a control channel (e.g., PDCCH), in particular if it is a physical layer channel and/or if it carries control plane information. Analogously, a channel carrying and/or for carrying data signaling/user information may be considered a data channel (e.g., PDSCH), in particular if it is a physical layer channel and/or if it carries user plane information. A channel may be defined for a specific communication direction, or for two complementary communication directions (e.g., UL and DL, or SL in two directions), in which case it may be considered to have two component channels, one for each direction.

Keep-alive message: As used herein, a "keep-alive message" can be a message used to maintain (or check a status of) a connection between UEs. A keep-alive message can be transmitted from one UE to another UE.

Keep-alive timer: As used herein, a "keep-alive timer" can be a timer used in a keep-alive procedure. For example, a keep-alive timer can be a timer used to activate transmission of a keep-alive message.

Note that the description given herein focuses on a 3GPP cellular communications system and, as such, 3GPP terminology or terminology similar to 3GPP terminology is generally used. However, the concepts disclosed herein are not limited to a 3GPP system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from the concepts, principles, and/or embodiments described herein.

In addition, functions and/or operations described herein as being performed by a wireless device or a network node may be distributed over a plurality of wireless devices and/or network nodes. Furthermore, although the term "cell" is used herein, it should be understood that (particularly with respect to 5G NR) beams may be used instead of cells and, as such, concepts described herein apply equally to both cells and beams.

As mentioned above, reuse of the LTE SL keep-alive procedure for NR SL operation creates various issues and/or problems, such that it is not preferred. As such, there is a need for an improved keep-alive procedure for NR SL operation. These issues and various solutions are discussed in more detail below.

Figure 5:
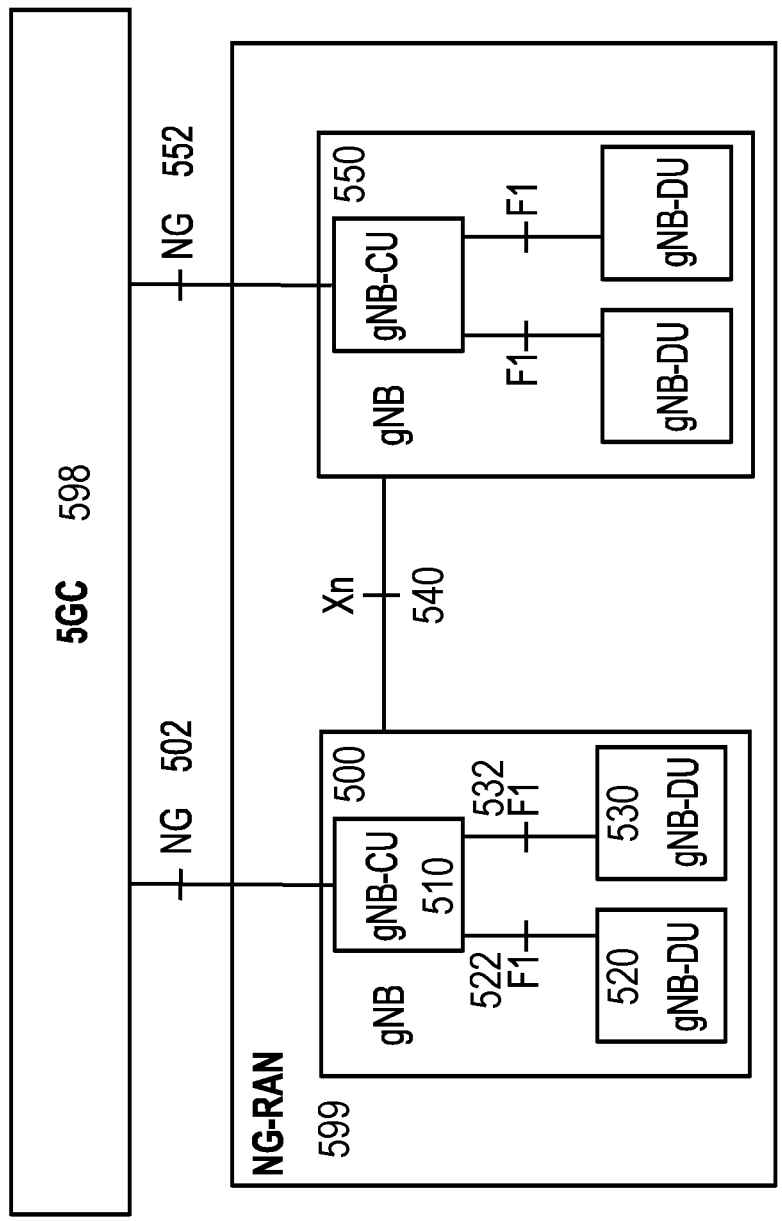
FIG. 5 shows a high-level view of an exemplary 5G network architecture.

FIG. 5 shows a high-level view of an exemplary 5G network architecture, including a Next Generation RAN (NG-RAN) 599 and a 5G Core (5GC) 598. NG-RAN 599 can include one or more gNodeB's (gNBs) connected to the 5GC via one or more NG interfaces, such as gNBs 500, 550 connected via interfaces 502, 552, respectively. More specifically, gNBs 500, 550 can be connected to one or more Access and Mobility Management Functions (AMF) in the 5GC 598 via respective NG-C interfaces. Similarly, gNBs 500, 550 can be connected to one or more User Plane Functions (UPFs) in 5GC 598 via respective NG-U interfaces.

Although not shown, in some deployments 5GC 598 can be replaced by an Evolved Packet Core (EPC), which conventionally has been used together with LTE E-UTRAN. In such deployments, gNBs 500, 550 can connect to one or more Mobility Management Entities (MMEs) in EPC 598 via respective S1-C interfaces. Similarly, gNBs 500, 550 can connect to one or more Serving Gateways (SGWs) in EPC via respective NG-U interfaces.

In addition, the gNBs can be connected to each other via one or more Xn interfaces, such as Xn interface 540 between gNBs 500 and 550. The radio technology for the NG-RAN is often referred to as "New Radio" (NR). With respect to the NR interface to UEs (also referred to as the "Uu interface"), each of the gNBs can support frequency division duplexing (FDD), time division duplexing (TDD), or a combination thereof. The radio-related protocols between UEs and the NG-RAN over the Uu interface are generally referred to as the access stratum (AS), while the protocols between UEs and the core network (e.g., 5GC or EPC) are generally referred to as the non-access stratum (NAS).

NG-RAN 599 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB is connected to all 5GC nodes within an "AMF Region" which is defined in 3GPP TS 23.501. If security protection for CP and UP data on TNL of NG-RAN interfaces is supported, network domain security/internet protocol (NDS/IP) may be applied (e.g., as defined in 3GPP TS 33.401).

The NG RAN logical nodes shown in FIG. 5 (and described in 3GPP TS 38.501 and 3GPP TR 38.801) include a Central Unit (CU or gNB-CU) and one or more Distributed Units (DU or gNB-DU). For example, gNB 500 includes gNB-CU 510 and gNB-DUs 520 and 530. CUs (e.g., gNB-CU 510) are logical nodes that host higher-layer protocols and perform various gNB functions such controlling the operation of DUs. A DU (e.g., gNB-DUs 520, 530) is a decentralized logical node that hosts lower layer protocols and can include, depending on the functional split option, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to one or more gNB-DUs over respective F1 logical interfaces, such as interfaces 522 and 532 shown in FIG. 5. However, a gNB-DU can be connected to only a single gNB-CU. The gNB-CU and connected gNB-DU(s) are only visible to other gNBs and the 5GC as a gNB. In other words, the F1 interface is not visible beyond gNB-CU.

Similar to LTE, the NR PHY uses CP-OFDM (Cyclic Prefix Orthogonal Frequency Division Multiplexing) in the DL and both CP-OFDM and Discrete Fourier Transform (DFT)-spread OFDM (DFT-S-OFDM) in the UL. In the time domain, NR DL and UL physical resources are organized into equal-sized, 1-ms subframes. Each subframe includes of one or more slots, and each slot includes 14 (for normal cyclic prefix) or 12 (for extended cyclic prefix) time-domain symbols.

Figure 6:
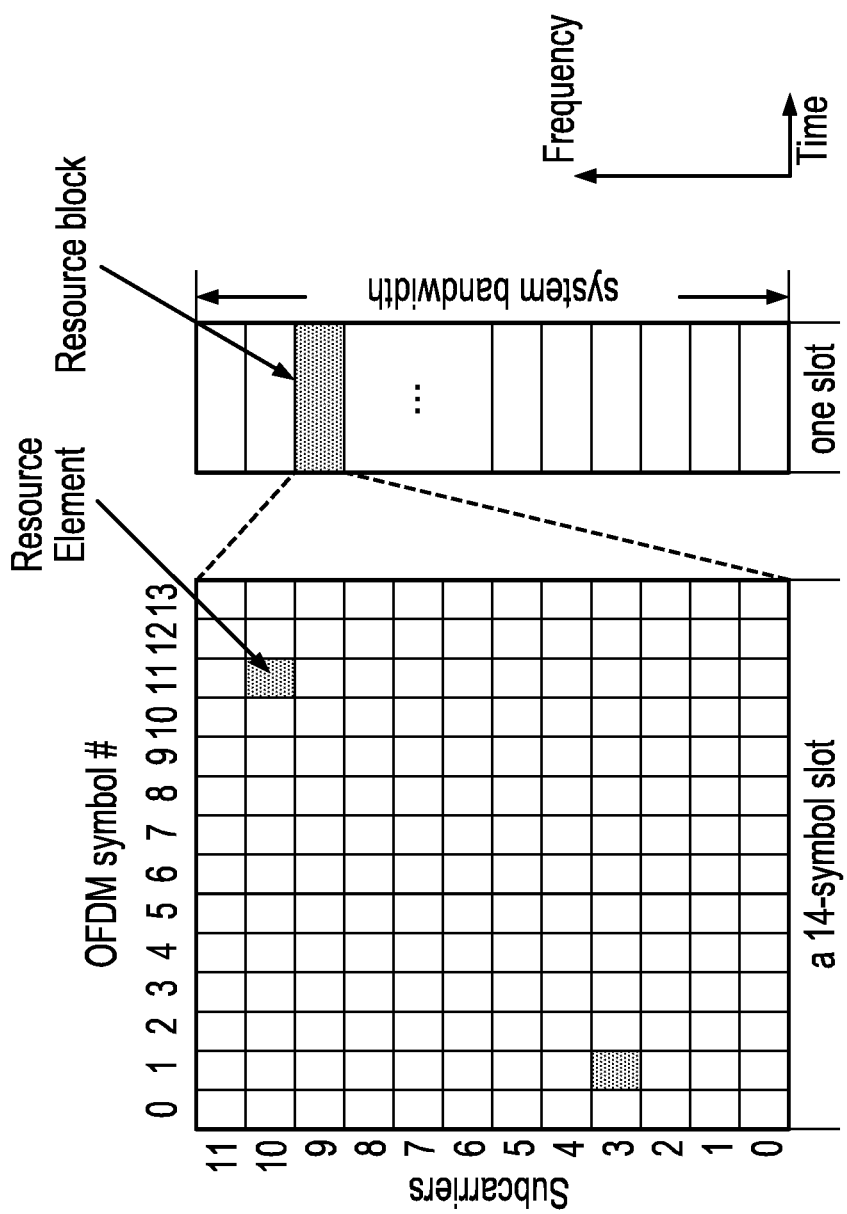
FIG. 6 shows an exemplary arrangement of a New Radio (NR) timeslot, including an exemplary time-frequency resource grid.

FIG. 6 shows an exemplary time-frequency resource grid for an NR slot. As illustrated in FIG. 6, a resource block (RB) consists of 12 contiguous, or consecutive, subcarriers in the frequency domain. In this example, the RB spans 14 symbols in the time domain for a duration of a 14-symbol slot, but in other examples may span a different number of symbols. Like in LTE, a resource element (RE) consists of one subcarrier in the frequency domain and one symbol in the time domain. Common RBs (CRBs) are numbered from 0 to the end of the system bandwidth.

Each carrier bandwidth part (BWP) configured for a UE has a common reference of CRB 0, such that a particular configured BWP may start at a CRB greater than zero. In Rel-15 NR, a UE can be configured with up to four DL BWPs with a single DL BWP being active at any given time. A UE can also be configured with up to four UL BWPs with a single UL BWP being active at any given time. For example, a UE can be configured with a narrow BWP (e.g., 12 MHz) and a wide BWP (e.g., 120 MHz), each starting at a particular CRB, but only one can be active for the UE at any given time.

Within a BWP, RBs are defined and numbered in the frequency domain from 0 to $N_{BWPi}^{size} - 1$, where i is the index of the particular carrier BWP. Similar to LTE, each NR resource element (RE) corresponds to one OFDM subcarrier during one OFDM symbol interval. Various subcarrier spacing (SCS) values (referred to as numerologies) are supported in NR and are given by $\Delta f = (15 \times 2^\mu)$ kHz where $\mu \in (0,1,2,3,4)$ denotes the numerology value. $\Delta f = 15$ kHz is the basic (or reference) subcarrier spacing that is also used in LTE. The slot length is inversely related to subcarrier spacing or numerology according to $\frac{1}{2}^\mu$ ms. For example, there is one (1-ms) slot per subframe for $\Delta f = 15$ kHz ($\mu = 0$), two 0.5-ms slots per subframe for $\Delta f = 30$ kHz ($\mu = 1$), etc. In addition, the RB bandwidth is directly related to numerology according to $2^\mu * 180$ kHz.

Table 1 below summarizes the supported NR transmission numerologies y and associated parameters. A UE's DL and UL numerologies can be configured independently by the network, subject to UE support.

TABLE 1

| μ | $\Delta f = 2^\mu \cdot 15$ [kHz] | Cyclic prefix | Slot length | RB BW (MHz) |
|---|---|---|---|---|
| 0 | 15 | Normal | 1 ms | 0.18 |
| 1 | 30 | Normal | 0.5 ms | 0.36 |
| 2 | 60 | Normal, Extended | 0.25 ms | 0.112 |
| 3 | 120 | Normal | 125 us | 1.44 |
| 4 | 240 | Normal | 62.5 us | 2.88 |

Figure 7:
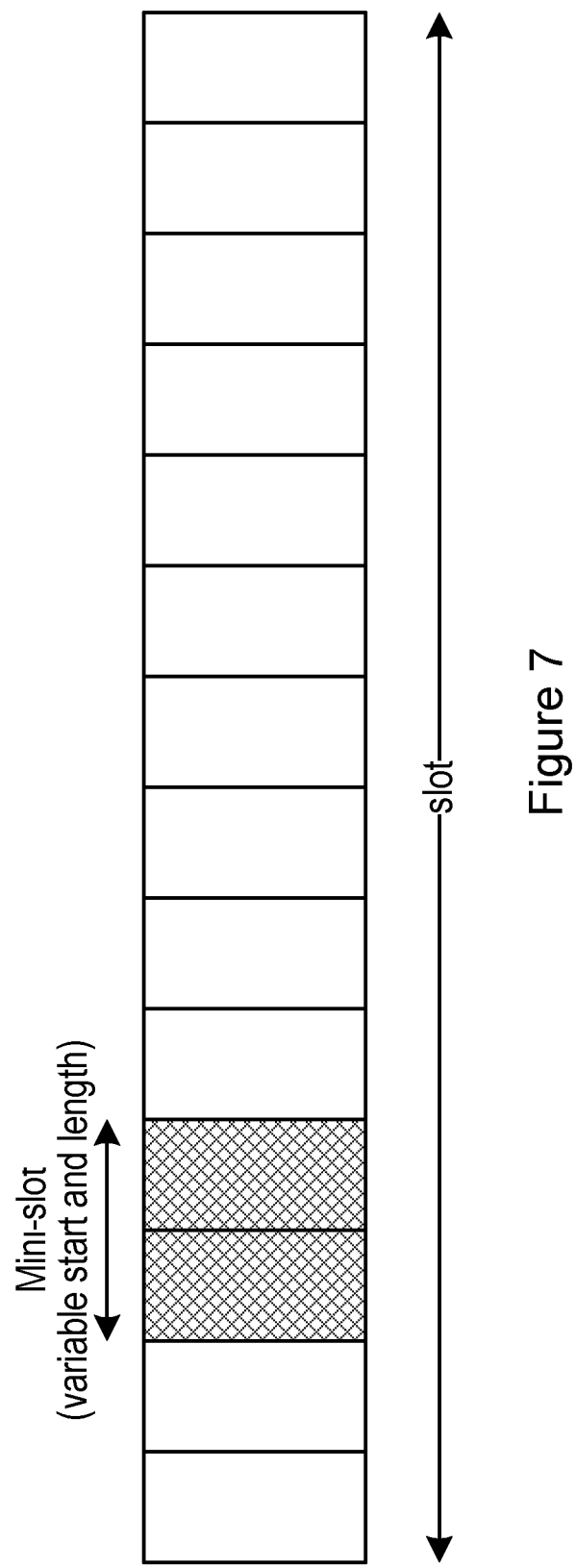
FIG. 7 shows an exemplary mini-slot arrangement within an NR slot.

In addition, NR includes a Type-B scheduling, also known as "mini-slots." These are shorter than slots, typically ranging from one symbol up to one less than the number of symbols in a slot (e.g., 11 or 13), and can start at any symbol of a slot. Mini-slots can be used if the transmission duration of a slot is too long and/or the occurrence of the next slot start (slot alignment) is too late. Applications of mini-slots include unlicensed spectrum and latency-critical transmission (e.g., URLLC). However, mini-slots are not service-specific and can also be used for eMBB or other services. FIG. 7 shows an exemplary mini-slot arrangement within an NR slot.

Figure 8:
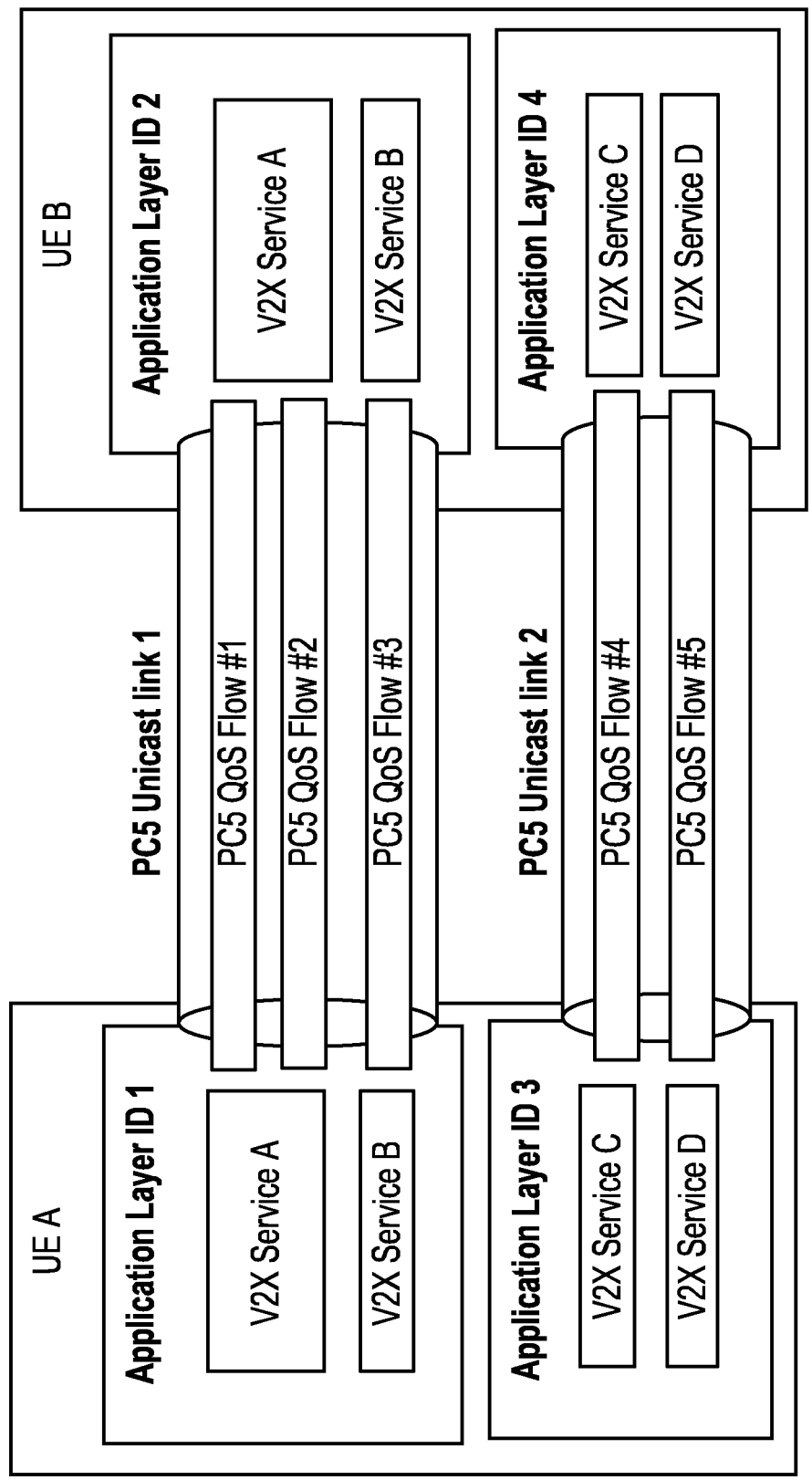
FIG. 8 shows an exemplary pair of UEs having two device-to-device (D2D) unicast sidelinks (SLs) supporting various QoS flows therebetween.

For NR SL over the PC5 interface, unicast at the access stratum (AS) is supported for services requiring high reliability. Between one pair of D2D UEs, there can be multiple SL unicast links and each link can support multiple SL QoS flows and/or radio bearers. FIG. 8 shows an exemplary pair of UEs, A and B, having two unicast links supporting a total of five (5) QoS flows between the UE pair. Each of the QoS flows can be associated with a particular V2X service running between UEs A and B over the PC5 interface (e.g., flows 1 and 2 are associated with V2X service A). Each unicast link can be identified by the source and destination layer-2 IDs. For instance, PC5 Unicast link 1 can be identified by the ID pair {ID1, ID2} associated with each end of the corresponding application.

In conventional communications over the Uu interface, UEs perform radio link monitoring (RLM) of the quality of their serving cell use that information to decide whether they are in-sync or out-of-sync in relation to that cell. Similarly, in V2X SL communication, each V2X UE monitors the radio link quality of the other V2X UE on the link, and uses that information to decide whether the UE is in in-sync or out-of-sync in relation to the other UE. Basically, once a SL unicast link is established, the involved UEs can monitor the radio link quality and claim radio link failure (RLF) if the link fails to meet certain criteria. Possible criteria include:

expiry of timer started after indication of radio problems (e.g., out of sync) from PHY;

maximum number of radio link control (RLC) layer retransmissions is reached;

maximum number of consecutive hybrid ARQ (HARQ) negative-acknowledgement (NACK) feedbacks is reached;

radio link signal quality (e.g., SNR) of reference signal transmitted by other UE fails to meet certain thresholds (e.g., Qout=10%, Qin=2%) corresponding to Block Error Rate (BLER) probabilities of hypothetical control channel; and/or channel busy ratio (CBR) is higher than a threshold value.

Figure 9:
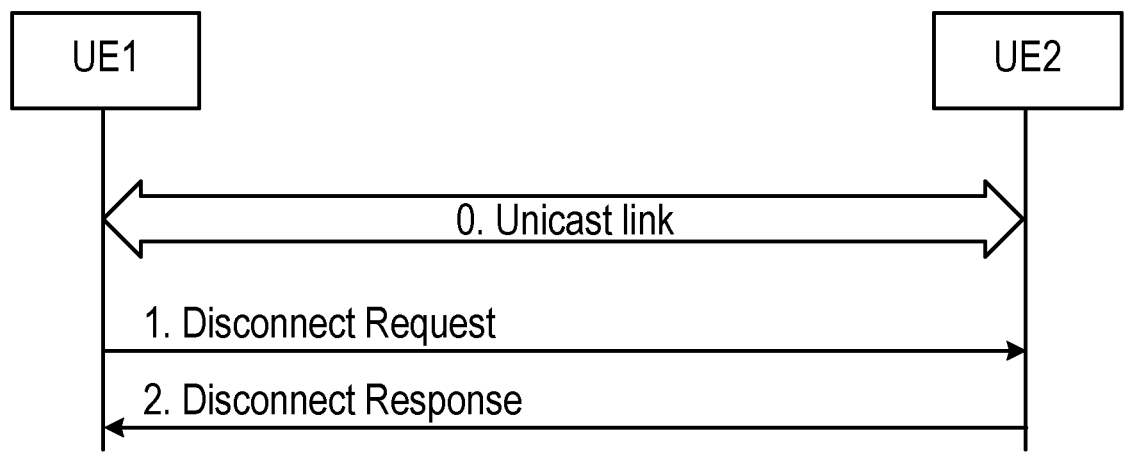
FIG. 9 shows an exemplary SL release signalling procedure between two D2D UEs.

Ultimately, a UE may release the established unicast link due to bad link quality or due to stopped service, using the link release signalling procedure shown in FIG. 9.

For example, UE1 shown in FIG. 9 transmits a transport block (TB) of data to UE2 at the PHY/MAC layer, but receives a HARQ NACK indicating that UE2 did not correctly decode the TB. UE1 will then retransmit the same TB one or more times. At the RLC layer, acknowledged mode (AM) is supported by NR SL, whereby UE1 will retransmit the same RLC protocol data unit (PDU) if an RLC NACK feedback is received from UE2. A physical-layer TB may contain one or more RLC PDUs.

UE1 will keep monitoring the link quality and declare RLF if the RLC PDU transmission fails after a maximum number of retransmission attempts. Likewise, UE1 can declare RLF if the maximum number of consecutive HARQ NACKs are received for a TB. Once RLF is declared, UE2 will trigger SL connection release as illustrated in FIG. 9.

In LTE D2D communication, a PC5-S keep-alive procedure is used to monitor the link quality, as defined in 3GPP TS 24.334. Basically, the requesting UE manages a keep-alive timer T4102 and a keep-alive counter for this procedure. The keep-alive timer T4102 is used to trigger periodic initiation of the procedure, and is started (or restarted) whenever the UE receives a PC5 signaling message or user-plane data from the peer UE over the SL The keep-alive counter is set to an initial value of zero after link establishment. The keep-alive procedure can also be referred to in the art as a data layer (or layer-2) link maintenance procedure.

Figure 10:
FIG. 10 shows a signal flow diagram for an exemplary LTE keep-alive procedure between a requesting UE and peer UE engaged in SL communications.

FIG. 10 shows a signal flow diagram for an exemplary LTE keep-alive procedure between a requesting UE and peer UE engaged in SL communications. The requesting UE may initiate the procedure under either of the following conditions: 1) a request from upper layers to check the viability of the direct link is received; or 2) the keep-alive timer T4102 for this link expires. The requesting UE initiates the procedure by stopping timer T4102 if it is still running and generating a DIRECT_COMMUNICATION_KEEPALIVE message with a keep-alive Counter IE that contains the value of the keep-alive counter for this link.

Optionally, the initiating UE may include a Maximum Inactivity Period IE to indicate the maximum inactivity period of the requesting UE over this direct link. For example, when a remote UE sends a DIRECT_COMMUNICATION_KEEPALIVE message to a proximity service (ProSe) UE-to-network relay UE, this IE shall be included.

After the DIRECT_COMMUNICATION_KEEPALIVE message is generated, the requesting UE passes this message to the lower layers for transmission along with the requesting UE's Layer 2 ID (for unicast communication) and the peer UE's Layer 2 ID (for unicast communication), and starts retransmission timer T4101. Upon receiving a DIRECT_COMMUNICATION_KEEPALIVE message, the peer UE shall respond with a DIRECT_COMMUNICATION_KEEPALIVE_ACK message including the Keep-alive Counter IE set to the same value as that received in the DIRECT_COMMUNICATION_KEEPALIVE message. Table 2 below provides further explanation of the timers used in the exemplary keep-alive procedure shown in FIG. 10.

TABLE 2

| TIMER | CAUSE OF START | NORMAL STOP | ON EXPIRY |
|---|---|---|---|
| T4101 | DIRECT_COMMUNICATION_KEEPALIVE message sent | Upon Receiving a DIRECT_COMMUNICATION_KEEPALIVE_ACK message or other PC5 Signaling message or user data from the peer UE | Retransmission of DIRECT_COMMUNICATION_KEEPALIVE message |
| T4102 | Upon Receiving a DIRECT_COMMUNICATION_KEEPALIVE_ACK message, or other PC5 Signaling message, or any user data from the peer UE | Upon receiving an upper layer request to check whether the direct link is alive and sending out a DIRECT_COMMUNICATION_KEEPALIVE message | Send a DIRECT_COMMUNICATION_KEEPALIVE message |

Since PHY/MAC layer HARQ retransmission and RLC layer retransmission are supported by NR SL, the link monitoring for NR SL unicast can rely on access stratum indications such as the RLF declaration discussed above. However, in case one UE in a NR SL unicast session hasn't received anything from the peer UE, there is no method for the UE to distinguish whether it is due to stopped transmission or due to packet loss caused by bad link quality. Accordingly, a keep-alive message procedure is still needed for NR SL, such that a keep-alive message can be sent if the peer UE appears inactive for a certain time.

However, the LTE keep-alive message solution discussed above is not preferred because it has various drawbacks when applied to NR SL. For instance, in LTE PC5-S layer will retransmit the same PC5-S keep-alive message until it receives a PC5-S ACK message from the peer UE. However, in NR SL, such retransmission is already performed at access stratum per PHY/MAC layer HARQ retransmission and RLC layer retransmission. Therefore PC5-S layer retransmission is not needed.

Exemplary embodiments of the present disclosure address these and other problems, drawbacks, and/or issues by providing novel, flexible, and efficient techniques for a D2D UE (e.g., UE1) that has an ongoing SL unicast connection with another peer D2D UE (e.g., UE2). In such embodiments, if UE1 does not receive any SL transmissions from the UE2 for a certain time (e.g., as defined by a timer, T_alive), this will trigger UE1 to send a PC5-S keep-alive message to the UE2. In case UE2 does not respond to the PC5-S keep-alive message, UE1 will start releasing the SL connection with UE2 without any retransmission attempts at PC5-S layer.

These exemplary embodiments provide various specific improvements that address various problems, issues, and/or drawbacks of previous solutions, including those discussed herein. For example, such embodiments facilitate reduced signaling between UEs by avoiding unnecessary transmissions of keep-alive messages and acknowledgements over the PC5-S layer. Such embodiments also provide new conditions for triggering keep-alive messages for the NR SL, e.g., HARQ feedback. In addition, such embodiments facilitate better fulfillment of service requirements by setting keep-alive message timers adaptively. In addition, such embodiments facilitate faster detection of RLF on PC5 for SL communications.

Various embodiments are described below in the context of the transmitting UE, referred to as UE1. Nevertheless, the described embodiments are also applicable to a receiving UE, referred to as UE2, or any UE in an ongoing NR SL unicast connection. Furthermore, the embodiments described below can be applied individually to each hop in a multi-hop UE-to-UE or UE-to-NW relay scenario, e.g., to release each hop-to-hop link.

In some embodiments, if UE1 has an ongoing SL unicast connection with UE2, and UE1 does not receive any SL transmissions from UE2 for a certain time (e.g., as defined by a timer, T_alive), this will trigger UE1 to send a PC5-S keep-alive message to the UE2. In case UE2 does not respond to the PC5-S keep-alive message from UE1, UE1 will start releasing the SL connection with UE2 without any retransmission attempts at PC5-S layer.

In some embodiments, UE1 will start (or restart) counting by the keep-alive timer, T_alive, upon the transmission of a PC5-S keep-alive message or reception of any of the following types of SL transmissions from UE2 (or any combination thereof):
  PC5 Signaling message,
  Any user data on physical sidelink shared channel (PSSCH),
  Sidelink Control Information on physical sidelink control channel (PSCCH),
  ACK HARQ feedback at PHY/MAC layer,
  NACK HARQ feedback at PHY/MAC layer,
  ACK feedback at RLC layer, or
  NACK feedback at RLC layer.

In some embodiments, upon the expiry (or expiration) of T_alive, UE1 transmits a PC5-S keep-alive message, resets T_alive to 0, and restarts counting by T_alive.

In some embodiments, UE1 can start (or restart) counting by another timer, T_release, upon the transmission of a PC5-S keep-alive message, and will stop counting by T_release upon reception of any of the following types of SL transmissions from UE2 (or any combination thereof):
  PC5 Signaling message,
  Any user data on physical sidelink shared channel (PSSCH),
  Sidelink Control Information on physical sidelink control channel (PSCCH),
  ACK HARQ feedback at PHY/MAC layer,
  NACK HARQ feedback at PHY/MAC layer,
  ACK feedback at RLC layer, or
  NACK feedback at RLC layer.

In some embodiments, upon the expiry of T_release, UE1 starts the SL connection release procedure (e.g., as shown in FIG. 9) and sends a PC5-S SL connection release request to UE2. In some embodiments, in response to declaration of RLF, UE1 starts the SL connection release procedure, and stops and/or resets timers T_alive and T_release.

In some embodiment, in response to declaration of RLF, UE1 releases the SL connection automatically without sending any PC5-S message to the peer UE, including PC5-S SL connection release or PC5-S ACK. In such scenarios, refraining from sending any PC5-S messages to UE2 is justified because the connection between UE1 and UE2 is so poor (e.g., as evidenced by RLF declaration) that UE2 is very unlikely to receive the message.

In some embodiments, UE1 can configure T_alive and/or T_release adaptively based on services currently running over the SL connection with UE2. For SL services requiring high reliability and low latency, it is critical to provide accurate, timely indications of link quality and/or status. Thus, a shorter T_alive can trigger UE1 to send PC5-S keep-alive messages more frequently, and a shorter T_release can trigger UE1 to release the SL unicast connection earlier during periods of poor quality and/or performance. In some embodiments, the UE can determine the settings for T_alive and/or T_release based on the PC5 PQI with the Priority Level. Here, PC5 PQI is the 5G Quality of Service (QoS) Identifier used in the PC5 interface. In general, PQI is a scalar used as a reference to PC5 QoS characteristics, e.g., parameters that control QoS forwarding treatment for the packets over PC5 interface. Such characteristics and/or parameters, as well as their relation to PCI scalar(s), can be predetermined or preconfigured (e.g., specified in a 3GPP standard) or configured in the UE via a network policy control function (PCF) using procedures defined in 3GPP TS 23.287.

In some embodiments, timers T_alive and T_release can be implemented by the same timer. For example, if the timers are set to the same value, only one of them can be used during the procedure.

In some embodiments, UE2 may selectively respond with a PC5-S ACK after successfully receiving a PC5-S keep-alive message from UE1. UE2's selective response can be determined and/or configurable based on various considerations, including the following:
  Responding to UE1 with a PC5-S ACK can facilitate UE2's monitoring of the quality of the link in the direction from UE2 to UE1. For example, failed transmission of PC5-S ACK may cause UE2 to declare RLF and/or trigger a SL connection release procedure by UE2.
  On the other hand, not responding to UE1 with a PC5-S ACK can reduce signaling overhead, which can be beneficial in case of certain channel conditions (e.g., congestion).

In some embodiments, one UE may decide whether PC5-S ACK is enabled and then inform the peer UE about this status. For example, UE1 can make this decision and inform UE2, which can also base its selective response on this received information. As an example, UE1 can add an indicator, bit, flag, field, etc. to the keep-alive message sent to UE2, indicating whether a PC5-S ACK is expected by UE1. As another example, UE2 can decide whether to support PC5-S ACK transmission and informs UE1 per PC5-S signaling during SL link establishment.

Figure 11:
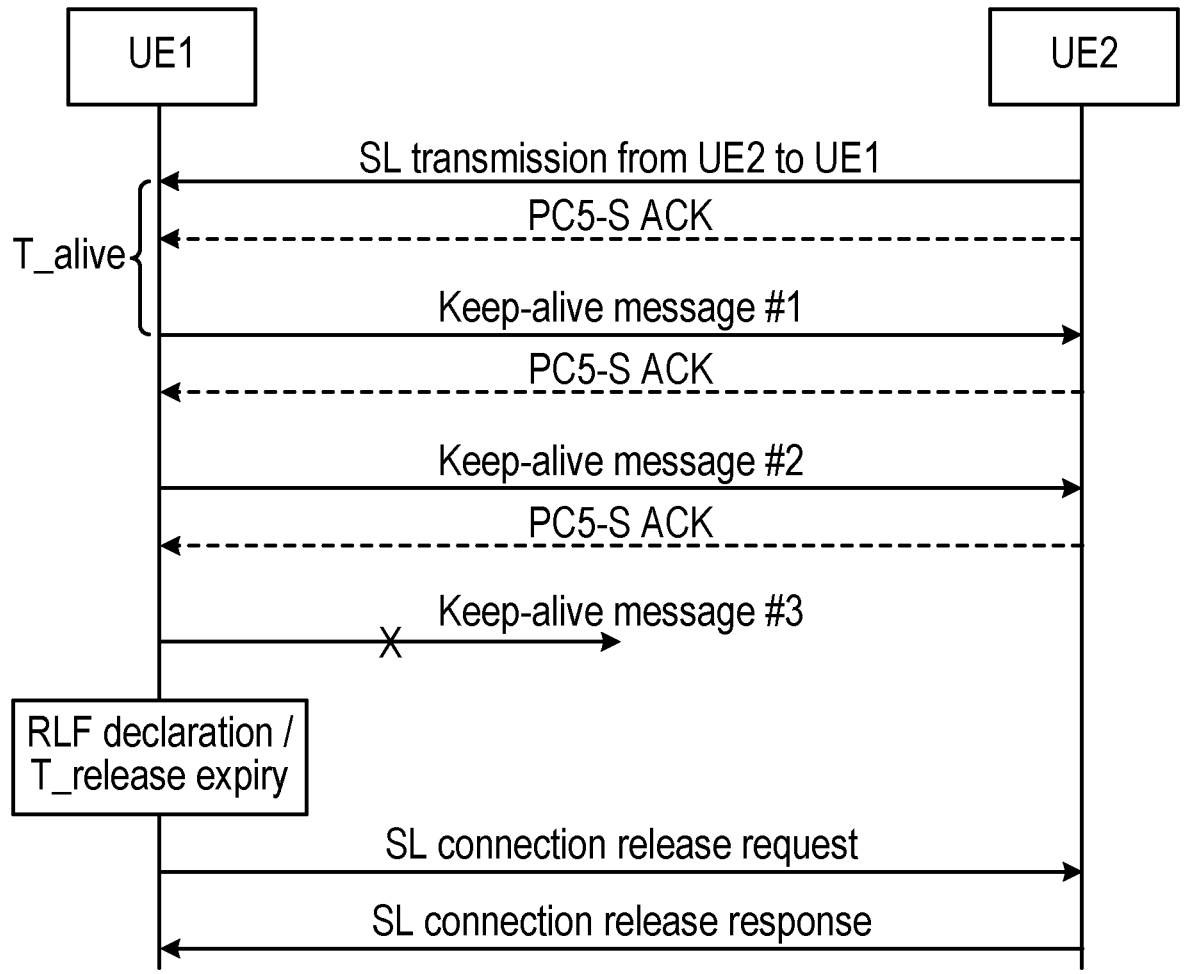
FIG. 11 shows a signal flow diagram of an exemplary keep-alive procedure between UE1 and UE2, according to various exemplary embodiments of the present disclosure.

FIG. 11 shows a signal flow diagram of an exemplary keep-alive procedure between UE1 and UE2, according to various exemplary embodiments of the present disclosure. Table 3 below also provides additional details concerning the operations of the timers, T_alive and T_release, during the keep-alive procedure shown in FIG. 11.

TABLE 3

| TIMER | CAUSE OF START | NORMAL STOP | ON EXPIRY |
|---|---|---|---|
| T_alive | Transmission of PC5-S keep alive message, or receiving one or more of the following: PC5 Signaling message, e.g. ACK; Any user data per PSSCH; SCI per PSCCH; ACK or NACK HARQ feedback at PHY/MAC layer; ACK or NACK feedback at RLC layer. | | Transmit a PC5-S keep alive message. |
| T_release | Transmission of PC5-S keep alive message | Receiving one or more of the following: PC5 Signaling message, e.g. ACK; Any user data per PSSCH; SCI per PSCCH; ACK or NACK HARQ feedback at PHY/MAC layer; ACK or NACK feedback at RLC layer. | Start link release procedure |

Initially, UE1 receives a SL transmission from UE2, which causes UE1 to start T_alive. However, UE1 receives no subsequent transmissions from UE2 before expiry of T_alive, which triggers UE1 to send a first keep-alive message to UE2 and to start T_release. UE2 receives this first keep-alive message and responds with a first PC5-S ACK. This causes UE1 to restart T_alive, which subsequently expires again with UE1 receiving a transmission from UE2. This triggers UE1 to send a second keep-alive message to UE2 and restart T_release. UE2 receives this second keep-alive message and responds with a second PC5-S ACK.

This causes UE1 to restart T_alive, which subsequently expires again with UE1 receiving a transmission from UE2. This triggers UE1 to send a third keep-alive message to UE2 and restart T_release. However, UE2 does not receive this third keep-alive message, and therefore does not respond with a PC5-S ACK before expiration of T_release. This causes UE1 to declare RLF and initiate the connection release procedure towards UE2.

These embodiments described above can be further illustrated with reference to FIGS. 12-13, which depict exemplary methods (e.g., procedures) performed by a first UE and a second UE, respectively. Put differently, various features of operations described below correspond to various aspects of embodiments described above.

Figure 12:
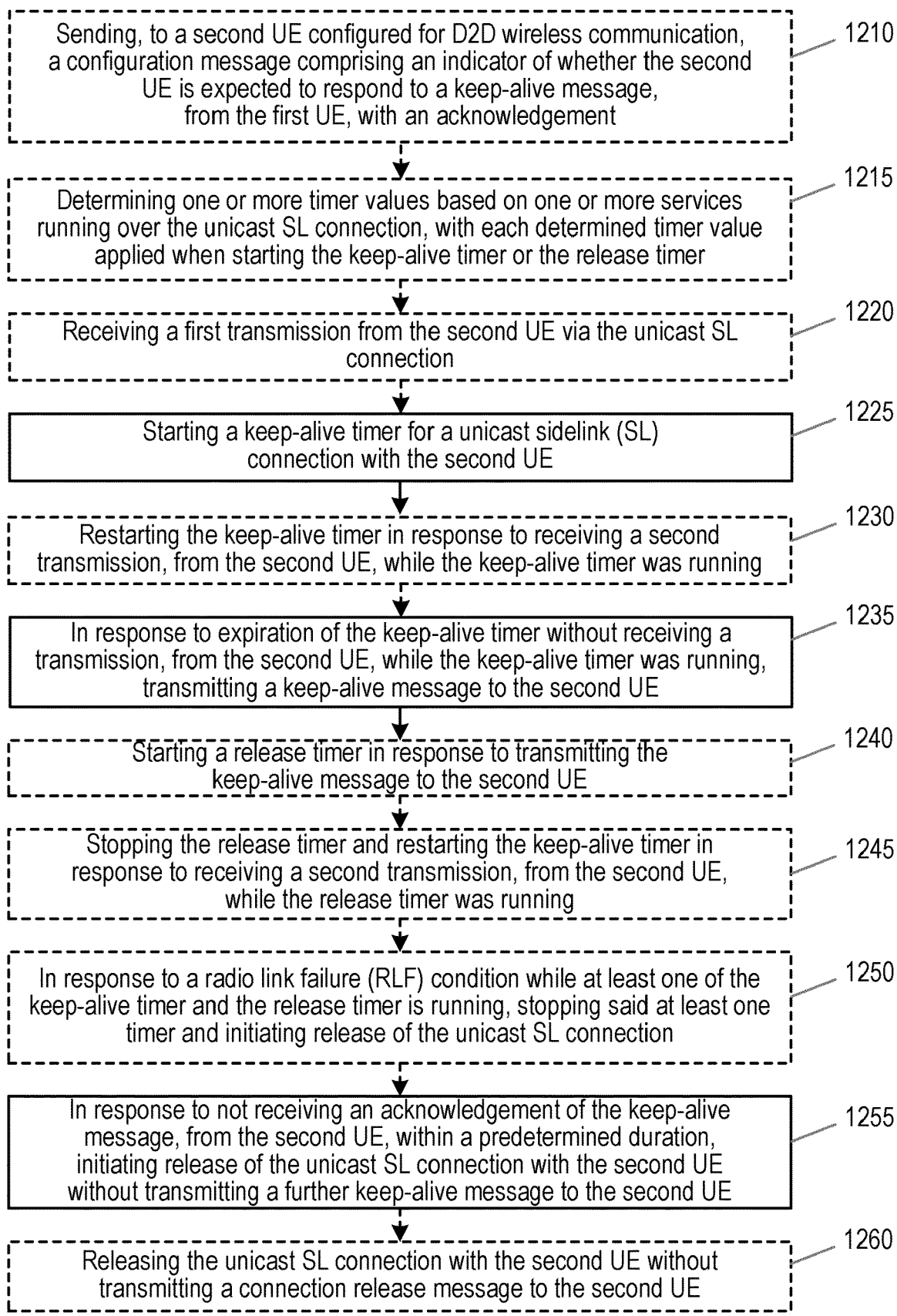
FIG. 12 illustrates an exemplary method (e.g., procedure) performed by a first UE configured for D2D wireless communication, according to exemplary embodiments of the present disclosure.

More specifically, FIG. 12 illustrates an exemplary method (e.g., procedure) performed by a first user equipment (UE) configured for device-to-device (D2D) wireless communication, according to exemplary embodiments of the present disclosure. For example, the first UE can be a transmitting UE (e.g., UE1) such as described above and in relation to other figures herein. Although the exemplary method is illustrated in FIG. 12 by specific blocks in a particular order, the operations corresponding to the blocks can be performed in different orders than shown and can be combined and/or divided into blocks having different functionality than shown. Furthermore, the exemplary method shown in FIG. 12 can be performed cooperatively with other exemplary methods described herein (e.g., FIG. 13) to provide various exemplary advantages and/or solutions to exemplary problems described herein. Optional blocks and/or operations are indicated by dashed lines.

In some embodiments, the exemplary method can include the operations of block 1210, where the first UE can send, to a second UE configured for D2D wireless communication, a configuration message comprising an indicator of whether the second UE is expected to respond to a keep-alive message, from the first UE, with an acknowledgement. The configuration message can be sent over an existing unicast SL connection between the first UE and the second UE, or during setup of such a unicast SL connection.

In some embodiments, the exemplary method can also include the operations of block 1215, where the first UE can determine one or more timer values based on one or more services running over the unicast SL connection. Each determined timer value can be applied when the first UE starts a keep-alive timer or a release timer associated with the unicast SL connection.

In some embodiments, the exemplary method can also include the operations of block 1220, where the first UE can receive a first transmission from the second UE via the unicast SL connection. The exemplary method can also include the operations of block 1225, where the first UE can start a keep-alive timer associated with unicast SL connection. In some embodiments, the keep-alive timer can be started in response to receiving the first transmission. In some embodiments, one of the timer values determined in block 1215 can be applied when starting the keep-alive timer. In various embodiments, the first transmission can be one or more of the following:
 a PC5 signaling message,
 user data on physical sidelink shared channel (PSSCH),
 sidelink control information (SCI) on physical sidelink control channel (PSCCH),
 ACK or NACK hybrid ARQ (HARQ) feedback on PHY and/or MAC layers, and
 ACK or NACK feedback on an RLC layer.

In some embodiments, the exemplary method can also include the operations of block 1230, where the first UE can restart the keep-alive timer in response to receiving a second transmission, from the second UE, while the keep-alive timer was running. For example, the second transmission can be any of the types of transmissions discussed above in relation to the first transmission.

The exemplary method can also include the operations of block 1235, where the first UE can, in response to expiration of the keep-alive timer without receiving a transmission, from the second UE while the keep-alive timer was running, transmit a keep-alive message to the second UE. In some embodiments, the exemplary method can also include the operations of block 1240, where the first UE can, in response to transmitting the keep-alive message to the second UE, start a release timer associated with the unicast SL connection. In some embodiments, one of the timer values determined in block 1215 can be applied when starting the release timer.

In some embodiments, the exemplary method can also include the operations of block 1245, where the first UE can stop the release timer and restart the keep-alive timer in response to receiving a second transmission, from the second UE, while the release timer was running.

In some embodiments, the exemplary method can also include the operations of block 1250, where the first UE can, in response to a radio link failure (RLF) condition while at least one of the keep-alive timer and the release timer is running, stop said at least one timer and initiate release of the unicast SL connection. For example, the first UE can perform such operations upon occurrence of a RLF due to a problem not related to the keep-alive signaling.

The exemplary method can also include the operations of block 1255, where the first UE can, in response to not receiving an acknowledgement of the keep-alive message, from the second UE within a predetermined duration, initiate release of the unicast SL connection with the second UE without transmitting a further keep-alive message to the second UE. In some embodiments, the predetermined duration is upon expiration of the release timer, e.g., if the release timer was started in block 1240 and is allowed to run until expiration.

In some embodiments, the exemplary method can also include the operations of block 1260, where the first UE can release the unicast SL connection with the second UE without transmitting a connection release message to the second UE. For example, as discussed above, the first UE can perform this operation when channel conditions of the unicast SL connection indicate that the second UE would not receive such a message.

Figure 13:
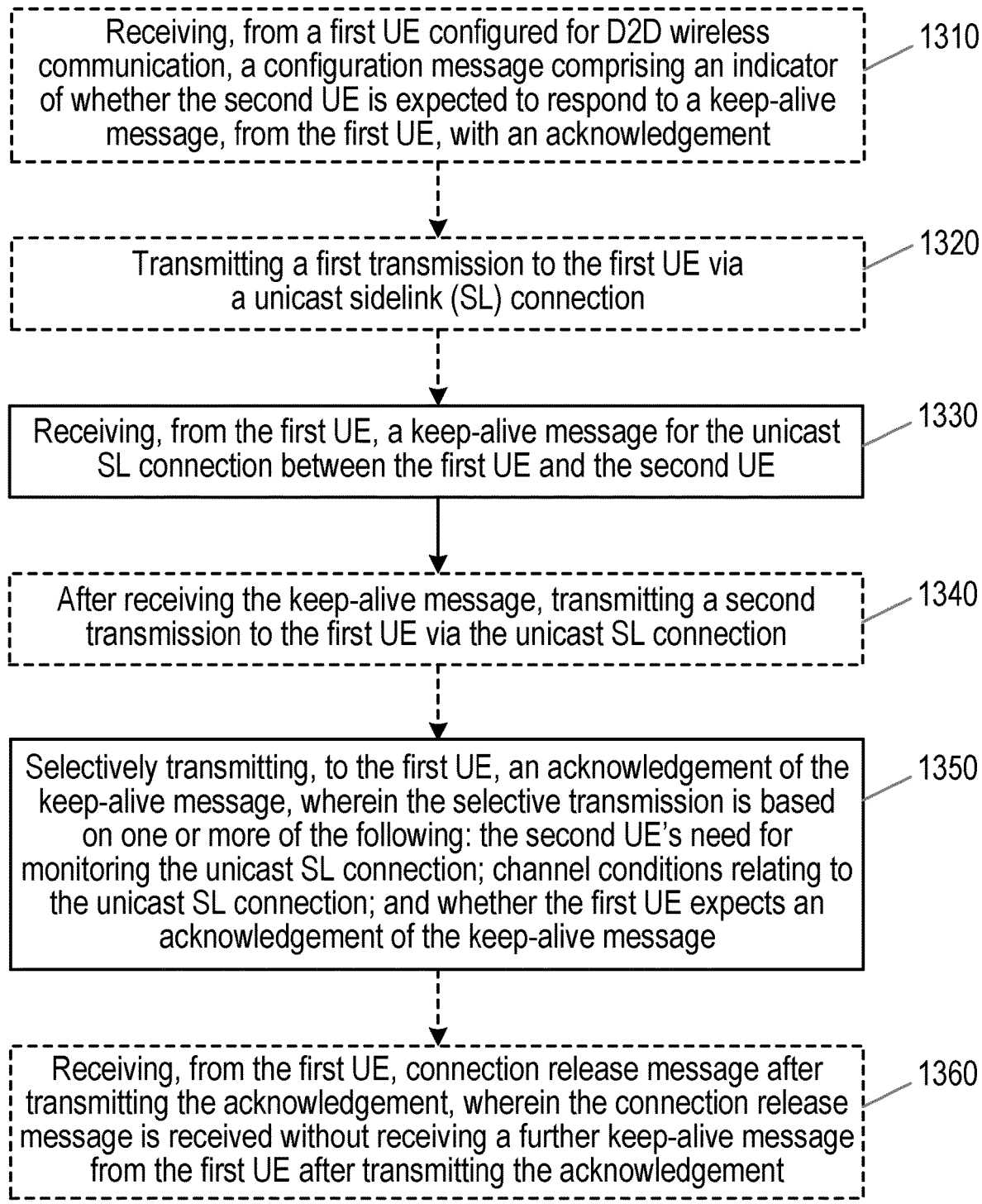
FIG. 13 illustrates an exemplary method (e.g., procedure) performed by a second UE configured for D2D wireless communication, according to exemplary embodiments of the present disclosure.

In addition, FIG. 13 illustrates an exemplary method (e.g., procedure) performed by a second user equipment (UE) configured for device-to-device (D2D) wireless communication, according to exemplary embodiments of the present disclosure. For example, the second UE can be a receiving UE (e.g., UE2) such as described above and in relation to other figures herein. Although the exemplary method is illustrated in FIG. 13 by specific blocks in a particular order, the operations corresponding to the blocks can be performed in different orders than shown and can be combined and/or divided into blocks having different functionality than shown. Furthermore, the exemplary method shown in FIG. 13 can be performed cooperatively with other exemplary methods described herein (e.g., FIG. 12) to provide various exemplary advantages and/or solutions to exemplary problems described herein. Optional blocks and/or operations are indicated by dashed lines.

In some embodiments, the exemplary method can include the operations of block 1310, where the second UE can receive, from a second UE configured for D2D wireless communication, a configuration message comprising an indicator of whether the second UE is expected to respond to a keep-alive message, from the first UE, with an acknowledgement. The configuration message can be received over an existing unicast SL connection between the first UE and the second UE, or during setup of such a unicast SL connection.

In some embodiments, the exemplary method can also include the operations of block 1320, where the second UE can transmit a first transmission to the first UE via the unicast SL connection. In various embodiments, the first transmission can be one or more of the following:
 a PC5 signaling message,
 user data on physical sidelink shared channel (PSSCH),
 sidelink control information (SCI) on physical sidelink control channel (PSCCH),
 ACK or NACK hybrid ARQ (HARQ) feedback on PHY and/or MAC layers, and
 ACK or NACK feedback on an RLC layer.

The exemplary method can also include the operations of block 1330, where the second UE can receive, from the first UE, a keep-alive message for the unicast SL connection between the first UE and the second UE. For example, the keep-alive message can be received after transmitting the first transmission (e.g., in block 1320). As discussed above, the first UE can start the keep-alive timer in response to receiving the first transmission, and the expiration of the keep-alive timer causes the first UE to transmit the keep-alive message.

In some embodiments, the exemplary method can also include the operations of block 1340, where the second UE can, after receiving the keep-alive message, transmit a second transmission to the first UE via the unicast SL connection. For example, the second transmission can be any of the types of transmissions discussed above in relation to the first transmission.

The exemplary method can also include the operations of block 1350, where the 10 second UE can selectively transmit, to the first UE, an acknowledgement of the keep-alive message. The selective transmission can be based on one or more of the following: the second UE's need for monitoring the unicast SL connection (e.g., for RLF); channel conditions (e.g., congestion) relating to the unicast SL connection; and whether the first UE expects an acknowledgement of the keep-alive message (e.g., as indicated in the configuration message received in block 1310). In some embodiments, the second UE may forego transmitting the acknowledgement if it has performed, or will perform, the second transmission in block 1340.

In some embodiments, the exemplary method can also include the operations of block 1360, where the second UE can receive, from the first UE, a connection release message. The connection release message can be received without the second UE receiving a further keep-alive message from the first UE. For example, the connection release message can be received after the UE transmits the acknowledgement or refrains from transmitting the acknowledge, e.g., as part of the selective transmission in block 1350. In either case, the first UE does not receive an acknowledgement and may send the connection release message without sending a further keep-alive message, as discussed in more detail above.

Figure 14:
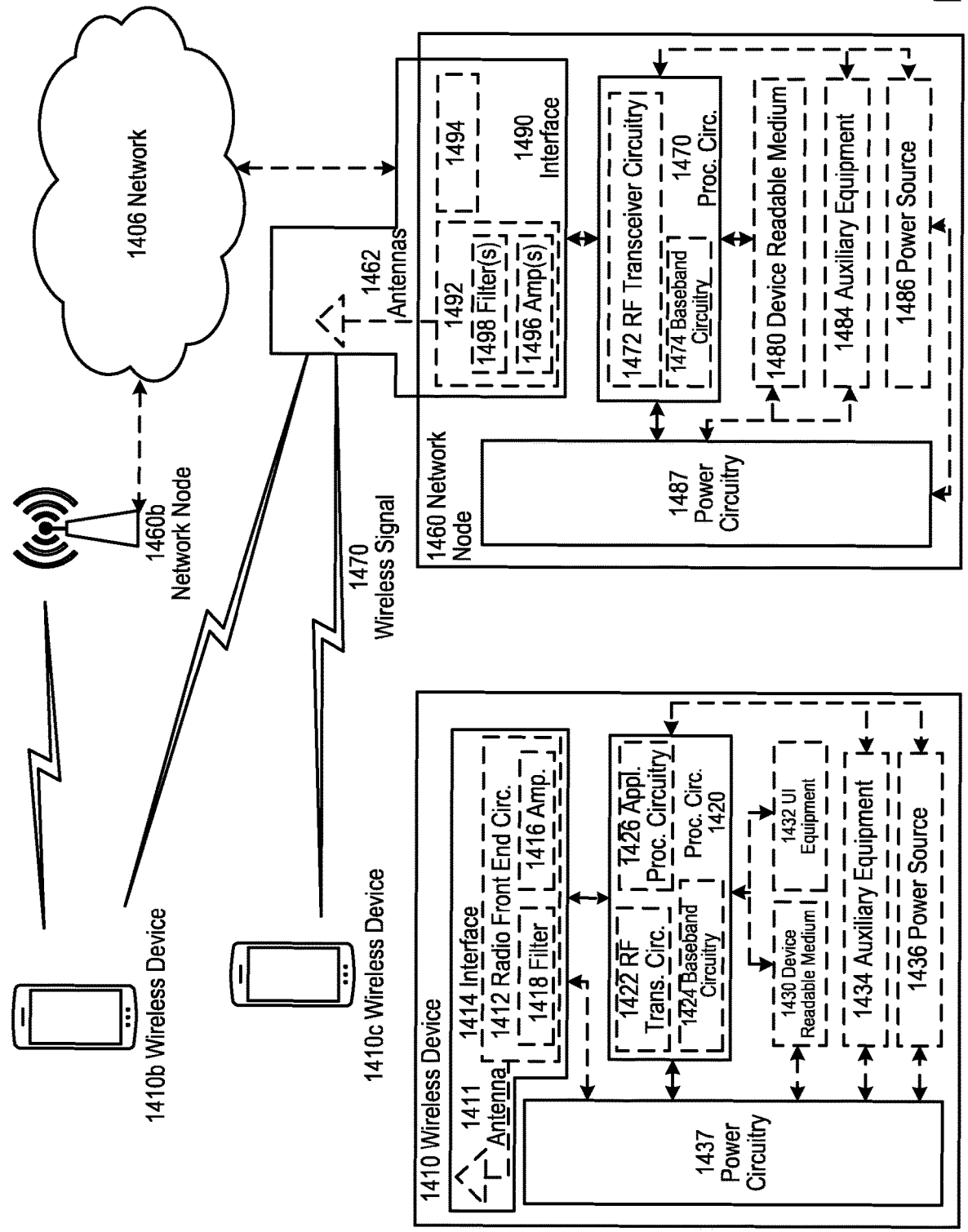
FIG. 14 is a block diagram of an exemplary wireless network configurable according to various exemplary embodiments of the present disclosure.

Although the subject matter described herein can be implemented in any appropriate type of system using any suitable components, the embodiments disclosed herein are described in relation to a wireless network, such as the example wireless network illustrated in FIG. 14. For simplicity, the wireless network of FIG. 14 only depicts network 1406, network nodes 1460 and 1460*b*, and wireless devices (WDs) 1410, 1410*b*, and 1410*c*. Any UE (e.g. the first UE and/or the second UE) described herein may correspond to any of the WDs 1410, 1410*b*, or 1410*c* illustrated in FIG. 14.

In practice, a wireless network can further include any additional elements suitable to support communication between wireless devices or between a wireless device and another communication device, such as a landline telephone, a service provider, or any other network node or end device. Of the illustrated components, network node 1460 and wireless device (WD) 1410 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1406 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1460 and WD 1410 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below.

In FIG. 14, network node 1460 includes processing circuitry 1470, device readable medium 1480, interface 1490, auxiliary equipment 1484, power source 1486, power circuitry 1487, and antenna 1462. Although network node 1460 illustrated in the example wireless network of FIG. 14 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 1460 are depicted as single boxes located within a larger box, or nested within multiple boxes, in practice, a network node can comprise multiple different physical components that make up a single illustrated component (e.g., device readable medium 1480 can comprise multiple separate hard drives as well as multiple RAM modules).

Similarly, network node 1460 can be composed of multiple physically separate components (e.g., a NodeB component and a RNC component, or a BTS component and a BSC component, etc.), which can each have their own respective components. In certain scenarios in which network node 1460 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 1460 can be configured to support multiple radio access technologies (RATs). In such embodiments, some components can be duplicated (e.g., separate device readable medium 1480 for the different RATs) and some components can be reused (e.g., the same antenna 1462 can be shared by the RATs). Network node 1460 can also include multiple sets of the various illustrated components for different wireless technologies integrated into network node 1460, such as, for example, GSM, WCDMA, LTE, NR, WiFi, or Bluetooth wireless technologies. These wireless technologies can be integrated into the same or different chip or set of chips and other components within network node 1460.

Processing circuitry 1470 can be configured to perform any determining, calculating, or similar operations (e.g., certain obtaining operations) described herein as being provided by a network node. These operations performed by processing circuitry 1470 can include processing information obtained by processing circuitry 1470 by, for example, converting the obtained information into other information, comparing the obtained information or converted information to information stored in the network node, and/or performing one or more operations based on the obtained information or converted information, and as a result of said processing making a determination.

Processing circuitry 1470 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1460 components, such as device readable medium 1480, network node 1460 functionality. Such functionality can include providing any of the various wireless features, functions, or benefits discussed herein.

For example, processing circuitry 1470 can execute instructions stored in device readable medium 1480 or in memory within processing circuitry 1470. In some embodiments, processing circuitry 1470 can include a system on a chip (SOC). As a more specific example, instructions (also referred to as a computer program product) stored in medium 1480 can include instructions that, when executed by processing circuitry 1470, can configure network node 1460 to perform operations corresponding to various exemplary methods (e.g., procedures) described herein.

In some embodiments, processing circuitry 1470 can include one or more of radio frequency (RF) transceiver circuitry 1472 and baseband processing circuitry 1474. In some embodiments, radio frequency (RF) transceiver circuitry 1472 and baseband processing circuitry 1474 can be on separate chips (or sets of chips), boards, or units, such as radio units and digital units. In alternative embodiments, part or all of RF transceiver circuitry 1472 and baseband processing circuitry 1474 can be on the same chip or set of chips, boards, or units In certain embodiments, some or all of the functionality described herein as being provided by a network node, base station, eNB or other such network device can be performed by processing circuitry 1470 executing instructions stored on device readable medium 1480 or memory within processing circuitry 1470. In alternative embodiments, some or all of the functionality can be provided by processing circuitry 1470 without executing instructions stored on a separate or discrete device readable medium, such as in a hard-wired manner. In any of those embodiments, whether executing instructions stored on a device readable storage medium or not, processing circuitry 1470 can be configured to perform the described functionality. The benefits provided by such functionality are not limited to processing circuitry 1470 alone or to other components of network node 1460, but are enjoyed by network node 1460 as a whole, and/or by end users and the wireless network generally.

Device readable medium 1480 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 1470. Device readable medium 1480 can store any suitable instructions, data or information, including a computer program, software, an application including one or more of logic, rules, code, tables, etc. and/or other instructions capable of being executed by processing circuitry 1470 and, utilized by network node 1460. Device readable medium 1480 can be used to store any calculations made by processing circuitry 1470 and/or any data received via interface 1490. In some embodiments, processing circuitry 1470 and device readable medium 1480 can be considered to be integrated.

Interface 1490 is used in the wired or wireless communication of signalling and/or data between network node 1460, network 1406, and/or WDs 1410. As illustrated, interface 1490 comprises port(s)/terminal(s) 1494 to send and receive data, for example to and from network 1406 over a wired connection. Interface 1490 also includes radio front end circuitry 1492 that can be coupled to, or in certain embodiments a part of, antenna 1462. Radio front end circuitry 1492 comprises filters 1498 and amplifiers 1496. Radio front end circuitry 1492 can be connected to antenna 1462 and processing circuitry 1470. Radio front end circuitry can be configured to condition signals communicated between antenna 1462 and processing circuitry 1470. Radio front end circuitry 1492 can receive digital data that is to be sent out to other network nodes or WDs via a wireless connection. Radio front end circuitry 1492 can convert the digital data into a radio signal having the appropriate channel and bandwidth parameters using a combination of filters 1498 and/or amplifiers 1496. The radio signal can then be transmitted via antenna 1462. Similarly, when receiving data, antenna 1462 can collect radio signals which are then converted into digital data by radio front end circuitry 1492. The digital data can be passed to processing circuitry 1470. In other embodiments, the interface can comprise different components and/or different combinations of components.

In certain alternative embodiments, network node 1460 may not include separate radio front end circuitry 1492, instead, processing circuitry 1470 can comprise radio front end circuitry and can be connected to antenna 1462 without separate radio front end circuitry 1492. Similarly, in some embodiments, all or some of RF transceiver circuitry 1472 can be considered a part of interface 1490. In still other embodiments, interface 1490 can include one or more ports or terminals 1494, radio front end circuitry 1492, and RF transceiver circuitry 1472, as part of a radio unit (not shown), and interface 1490 can communicate with baseband processing circuitry 1474, which is part of a digital unit (not shown).

Antenna 1462 can include one or more antennas, or antenna arrays, configured to send and/or receive wireless signals. Antenna 1462 can be coupled to radio front end circuitry 1490 and can be any type of antenna capable of transmitting and receiving data and/or signals wirelessly. In some embodiments, antenna 1462 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 1462 can be separate from network node 1460 and can be connectable to network node 1460 through an interface or port.

Antenna 1462, interface 1490, and/or processing circuitry 1470 can be configured to perform any receiving operations and/or certain obtaining operations described herein as being performed by a network node. Any information, data and/or signals can be received from a wireless device, another network node and/or any other network equipment. Similarly, antenna 1462, interface 1490, and/or processing circuitry 1470 can be configured to perform any transmitting operations described herein as being performed by a network node. Any information, data and/or signals can be transmitted to a wireless device, another network node and/or any other network equipment.

Power circuitry 1487 can comprise, or be coupled to, power management circuitry and can be configured to supply the components of network node 1460 with power for performing the functionality described herein. Power circuitry 1487 can receive power from power source 1486. Power source 1486 and/or power circuitry 1487 can be configured to provide power to the various components of network node 1460 in a form suitable for the respective components (e.g., at a voltage and current level needed for each respective component). Power source 1486 can either be included in, or external to, power circuitry 1487 and/or network node 1460. For example, network node 1460 can be connectable to an external power source (e.g., an electricity outlet) via an input circuitry or interface such as an electrical cable, whereby the external power source supplies power to power circuitry 1487. As a further example, power source 1486 can comprise a source of power in the form of a battery or battery pack which is connected to, or integrated in, power circuitry 1487. The battery can provide backup power should the external power source fail. Other types of power sources, such as photovoltaic devices, can also be used.

Alternative embodiments of network node 1460 can include additional components beyond those shown in FIG. 14 that can be responsible for providing certain aspects of the network node's functionality, including any of the functionality described herein and/or any functionality necessary to support the subject matter described herein. For example, network node 1460 can include user interface equipment to allow and/or facilitate input of information into network node 1460 and to allow and/or facilitate output of information from network node 1460. This can allow and/or facilitate a user to perform diagnostic, maintenance, repair, and other administrative functions for network node 1460.

In some embodiments, a wireless device (WD, e.g., WD 1410) can be configured to transmit and/or receive information without direct human interaction. For instance, a WD can be designed to transmit information to a network on a predetermined schedule, when triggered by an internal or external event, or in response to requests from the network. Examples of a WD include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements, and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 1410 includes antenna 1411, interface 1414, processing circuitry 1420, device readable medium 1430, user interface equipment 1432, auxiliary equipment 1434, power source 1436 and power circuitry 1437. WD 1410 can include multiple sets of one or more of the illustrated components for different wireless technologies supported by WD 1410, such as, for example, GSM, WCDMA, LTE, NR, WiFi, WiMAX, or Bluetooth wireless technologies, just to mention a few. These wireless technologies can be integrated into the same or different chips or set of chips as other components within WD 1410.

Antenna 1411 can include one or more antennas or antenna arrays, configured to send and/or receive wireless signals, and is connected to interface 1414. In certain alternative embodiments, antenna 1411 can be separate from WD 1410 and be connectable to WD 1410 through an interface or port. Antenna 1411, interface 1414, and/or processing circuitry 1420 can be configured to perform any receiving or transmitting operations described herein as being performed by a WD. Any information, data and/or signals can be received from a network node and/or another WD. In some embodiments, radio front end circuitry and/or antenna 1411 can be considered an interface. Although not illustrated in FIG. 14, WDs 1410*b* and 1410*c* can communicate with each other (e.g. wirelessly) via a sidelink. A sidelink communication can be defined as a (direct) communication between WDs 1410*b* and 1410*c* without a relay through a base station.

As illustrated, interface 1414 comprises radio front end circuitry 1412 and antenna 1411. Radio front end circuitry 1412 comprise one or more filters 1418 and amplifiers 1416. Radio front end circuitry 1414 is connected to antenna 1411 and processing circuitry 1420, and can be configured to condition signals communicated between antenna 1411 and processing circuitry 1420. Radio front end circuitry 1412 can be coupled to or a part of antenna 1411. In some embodiments, WD 1410 may not include separate radio front end circuitry 1412; rather, processing circuitry 1420 can comprise radio front end circuitry and can be connected to antenna 1411. Similarly, in some embodiments, some or all of RF transceiver circuitry 1422 can be considered a part of interface 1414. Radio front end circuitry 1412 can receive digital data that is to be sent out to other network nodes or WDs via a wireless connection. Radio front end circuitry 1412 can convert the digital data into a radio signal having the appropriate channel and bandwidth parameters using a combination of filters 1418 and/or amplifiers 1416. The radio signal can then be transmitted via antenna 1411. Similarly, when receiving data, antenna 1411 can collect radio signals which are then converted into digital data by radio front end circuitry 1412. The digital data can be passed to processing circuitry 1420. In other embodiments, the interface can comprise different components and/or different combinations of components.

Processing circuitry 1420 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1410 components, such as device readable medium 1430, WD 1410 functionality. Such functionality can include providing any of the various wireless features or benefits discussed herein.

For example, processing circuitry 1420 can execute instructions stored in device readable medium 1430 or in memory within processing circuitry 1420 to provide the functionality disclosed herein. As a more specific example, instructions (also referred to as a computer program product) stored in medium 1430 can include instructions that, when executed by processor 1420, can configure wireless device 1410 to perform operations corresponding to various exemplary methods (e.g., procedures) described herein.

As illustrated, processing circuitry 1420 includes one or more of RF transceiver circuitry 1422, baseband processing circuitry 1424, and application processing circuitry 1426. In other embodiments, the processing circuitry can comprise different components and/or different combinations of components. In certain embodiments processing circuitry 1420 of WD 1410 can comprise a SOC. In some embodiments, RF transceiver circuitry 1422, baseband processing circuitry 1424, and application processing circuitry 1426 can be on separate chips or sets of chips. In alternative embodiments, part or all of baseband processing circuitry 1424 and application processing circuitry 1426 can be combined into one chip or set of chips, and RF transceiver circuitry 1422 can be on a separate chip or set of chips. In still alternative embodiments, part or all of RF transceiver circuitry 1422 and baseband processing circuitry 1424 can be on the same chip or set of chips, and application processing circuitry 1426 can be on a separate chip or set of chips. In yet other alternative embodiments, part or all of RF transceiver circuitry 1422, baseband processing circuitry 1424, and application processing circuitry 1426 can be combined in the same chip or set of chips. In some embodiments, RF transceiver circuitry 1422 can be a part of interface 1414. RF transceiver circuitry 1422 can condition RF signals for processing circuitry 1420.

In certain embodiments, some or all of the functionality described herein as being performed by a WD can be provided by processing circuitry 1420 executing instructions stored on device readable medium 1430, which in certain embodiments can be a computer-readable storage medium. In alternative embodiments, some or all of the functionality can be provided by processing circuitry 1420 without executing instructions stored on a separate or discrete device readable storage medium, such as in a hard-wired manner. In any of those particular embodiments, whether executing instructions stored on a device readable storage medium or not, processing circuitry 1420 can be configured to perform the described functionality. The benefits provided by such functionality are not limited to processing circuitry 1420 alone or to other components of WD 1410, but are enjoyed by WD 1410 as a whole, and/or by end users and the wireless network generally.

Processing circuitry 1420 can be configured to perform any determining, calculating, or similar operations (e.g., certain obtaining operations) described herein as being performed by a WD. These operations, as performed by processing circuitry 1420, can include processing information obtained by processing circuitry 1420 by, for example, converting the obtained information into other information, comparing the obtained information or converted information to information stored by WD 1410, and/or performing one or more operations based on the obtained information or converted information, and as a result of said processing making a determination.

Device readable medium 1430 can be operable to store a computer program, software, an application including one or more of logic, rules, code, tables, etc. and/or other instructions capable of being executed by processing circuitry 1420. Device readable medium 1430 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 1420. In some embodiments, processing circuitry 1420 and device readable medium 1430 can be considered to be integrated.

User interface equipment 1432 can include components that allow and/or facilitate a human user to interact with WD 1410. Such interaction can be of many forms, such as visual, audial, tactile, etc. User interface equipment 1432 can be operable to produce output to the user and to allow and/or facilitate the user to provide input to WD 1410. The type of interaction can vary depending on the type of user interface equipment 1432 installed in WD 1410. For example, if WD 1410 is a smart phone, the interaction can be via a touch screen; if WD 1410 is a smart meter, the interaction can be through a screen that provides usage (e.g., the number of gallons used) or a speaker that provides an audible alert (e.g., if smoke is detected). User interface equipment 1432 can include input interfaces, devices and circuits, and output interfaces, devices and circuits. User interface equipment 1432 can be configured to allow and/or facilitate input of information into WD 1410, and is connected to processing circuitry 1420 to allow and/or facilitate processing circuitry 1420 to process the input information. User interface equipment 1432 can include, for example, a microphone, a proximity or other sensor, keys/buttons, a touch display, one or more cameras, a universal serial bus (USB) port, or other input circuitry. User interface equipment 1432 is also configured to allow and/or facilitate output of information from WD 1410, and to allow and/or facilitate processing circuitry 1420 to output information from WD 1410. User interface equipment 1432 can include, for example, a speaker, a display, vibrating circuitry, a USB port, a headphone interface, or other output circuitry. Using one or more input and output interfaces, devices, and circuits, of user interface equipment 1432, WD 1410 can communicate with end users and/or the wireless network, and allow and/or facilitate them to benefit from the functionality described herein.

Auxiliary equipment 1434 is operable to provide more specific functionality which may not be generally performed by WDs. This can comprise specialized sensors for doing measurements for various purposes, interfaces for additional types of communication such as wired communications etc. The inclusion and type of components of auxiliary equipment 1434 can vary depending on the embodiment and/or scenario.

Power source 1436 can, in some embodiments, be in the form of a battery or battery pack. Other types of power sources, such as an external power source (e.g., an electricity outlet), photovoltaic devices or power cells, can also be used. WD 1410 can further comprise power circuitry 1437 for delivering power from power source 1436 to the various parts of WD 1410 which need power from power source 1436 to carry out any functionality described or indicated herein. Power circuitry 1437 can in certain embodiments comprise power management circuitry. Power circuitry 1437 can additionally or alternatively be operable to receive power from an external power source; in which case WD 1410 can be connectable to the external power source (such as an electricity outlet) via input circuitry or an interface such as an electrical power cable. Power circuitry 1437 can also in certain embodiments be operable to deliver power from an external power source to power source 1436. This can be, for example, for the charging of power source 1436. Power circuitry 1437 can perform any converting or other modification to the power from power source 1436 to make it suitable for supply to the respective components of WD 1410.

Figure 15:
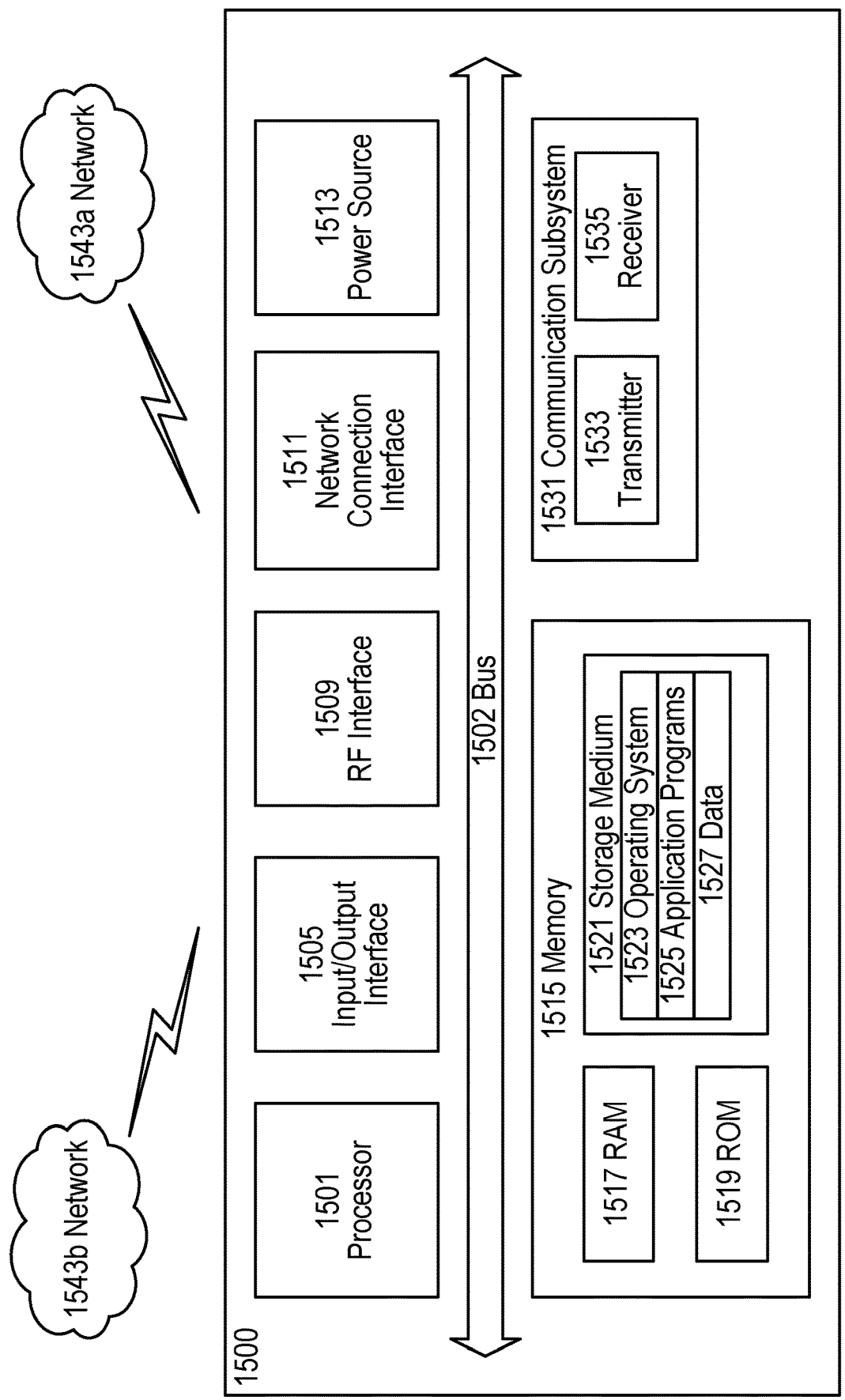
FIG. 15 is a block diagram of an exemplary user equipment (UE) configurable according to various exemplary embodiments of the present disclosure.

FIG. 15 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 15200 can be any UE identified by the $3^{rd}$ Generation Partnership Project (3GPP), including a NB-IoT UE, a machine type communication (MTC) UE, and/or an enhanced MTC (eMTC) UE. UE 1500, as illustrated in FIG. 15, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE can be used interchangeable. Accordingly, although FIG. 15 is a UE, the components discussed herein are equally applicable to a WD, and vice-versa. Any UE (e.g. the first UE and/or the second UE) described herein may correspond to the UE 1500 illustrated in FIG. 15.

In FIG. 15, UE 1500 includes processing circuitry (or a processor) 1501 that is operatively coupled to input/output interface 1505, radio frequency (RF) interface 1509, network connection interface 1511, memory 1515 including random access memory (RAM) 1517, read-only memory (ROM) 1519, and storage medium 1521 or the like, communication subsystem 1531, power source 1513, and/or any other component, or any combination thereof. Storage medium 1521 includes operating system 1523, application program 1525, and data 1527. In other embodiments, storage medium 1521 can include other similar types of information. Certain UEs can utilize all of the components shown in FIG. 15, or only a subset of the components. The level of integration between the components can vary from one UE to another UE. Further, certain UEs can contain multiple instances of a component, such as multiple processors, memories, transceivers, transmitters, receivers, etc.

In FIG. 15, processing circuitry 1501 can be configured to process computer instructions and data. Processing circuitry 1501 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1501 can include two central processing units (CPUs). Data can be information in a form suitable for use by a computer.

In the depicted embodiment, input/output interface 1505 can be configured to provide a communication interface to an input device, output device, or input and output device. UE 1500 can be configured to use an output device via input/output interface 1505. An output device can use the same type of interface port as an input device. For example, a USB port can be used to provide input to and output from UE 1500. The output device can be a speaker, a sound card, a video card, a display, a monitor, a printer, an actuator, an emitter, a smartcard, another output device, or any combination thereof. UE 1500 can be configured to use an input device via input/output interface 1505 to allow and/or facilitate a user to capture information into UE 1500. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 15, RF interface 1509 can be configured to provide a communication interface to RF components such as a transmitter, a receiver, and an antenna. Network connection interface 1511 can be configured to provide a communication interface to network 1543*a*. Network 1543*a* can encompass wired and/or wireless networks such as a local-area network (LAN), a wide-area network (WAN), a computer network, a wireless network, a telecommunications network, another like network or any combination thereof. For example, network 1543*a* can comprise a Wi-Fi network. Network connection interface 1511 can be configured to include a receiver and a transmitter interface used to communicate with one or more other devices over a communication network according to one or more communication protocols, such as Ethernet, TCP/IP, SONET, ATM, or the like. Network connection interface 1511 can implement receiver and transmitter functionality appropriate to the communication network links (e.g., optical, electrical, and the like). The transmitter and receiver functions can share circuit components, software or firmware, or alternatively can be implemented separately.

RAM 1517 can be configured to interface via bus 1502 to processing circuitry 1501 to provide storage or caching of data or computer instructions during the execution of software programs such as the operating system, application programs, and device drivers. ROM 1519 can be configured to provide computer instructions or data to processing circuitry 1501. For example, ROM 1519 can be configured to store invariant low-level system code or data for basic system functions such as basic input and output (I/O), startup, or reception of keystrokes from a keyboard that are stored in a non-volatile memory. Storage medium 1521 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives.

In one example, storage medium 1521 can be configured to include operating system 1523, application program 1525 such as a web browser application, a widget or gadget engine or another application, and data file 1527. Storage medium 1521 can store, for use by UE 1500, any of a variety of various operating systems or combinations of operating systems. For example, application program 1525 can include executable program instructions (also referred to as a computer program product) that, when executed by processing circuitry 1501, can configure UE 1500 to perform operations corresponding to various exemplary methods (e.g., procedures) described herein.

Storage medium 1521 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1521 can allow and/or facilitate UE 1500 to access computer-executable instructions, application programs or the like, stored on transitory or non-transitory memory media, to off-load data, or to upload data. An article of manufacture, such as one utilizing a communication system can be tangibly embodied in storage medium 1521, which can comprise a device readable medium.

In FIG. 15, processing circuitry 1501 can be configured to communicate with network 1543b using communication subsystem 1531. Network 1543a and network 1543b can be the same network or networks or different network or networks. Communication subsystem 1531 can be configured to include one or more transceivers used to communicate with network 1543b. For example, communication subsystem 1531 can be configured to include one or more transceivers used to communicate with one or more remote transceivers of another device capable of wireless communication such as another WD, UE, or base station of a radio access network (RAN) according to one or more communication protocols, such as IEEE 802.15, CDMA, WCDMA, GSM, LTE, UTRAN, WiMax, or the like. Each transceiver can include transmitter 1533 and/or receiver 1535 to implement transmitter or receiver functionality, respectively, appropriate to the RAN links (e.g., frequency allocations and the like). Further, transmitter 1533 and receiver 1535 of each transceiver can share circuit components, software or firmware, or alternatively can be implemented separately.

In the illustrated embodiment, the communication functions of communication subsystem 1531 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 1531 can include cellular communication, Wi-Fi communication, Bluetooth communication, and GPS communication. Network 1543b can encompass wired and/or wireless networks such as a local-area network (LAN), a wide-area network (WAN), a computer network, a wireless network, a telecommunications network, another like network or any combination thereof. For example, network 1543b can be a cellular network, a Wi-Fi network, and/or a near-field network. Power source 1513 can be configured to provide alternating current (AC) or direct current (DC) power to components of UE 1500.

The features, benefits and/or functions described herein can be implemented in one of the components of UE 1500 or partitioned across multiple components of UE 1500. Further, the features, benefits, and/or functions described herein can be implemented in any combination of hardware, software or firmware. In one example, communication subsystem 1531 can be configured to include any of the components described herein. Further, processing circuitry 1501 can be configured to communicate with any of such components over bus 1502. In another example, any of such components can be represented by program instructions stored in memory that when executed by processing circuitry 1501 perform the corresponding functions described herein. In another example, the functionality of any of such components can be partitioned between processing circuitry 1501 and communication subsystem 1531. In another example, the non-computationally intensive functions of any of such components can be implemented in software or firmware and the computationally intensive functions can be implemented in hardware.

Figure 16:
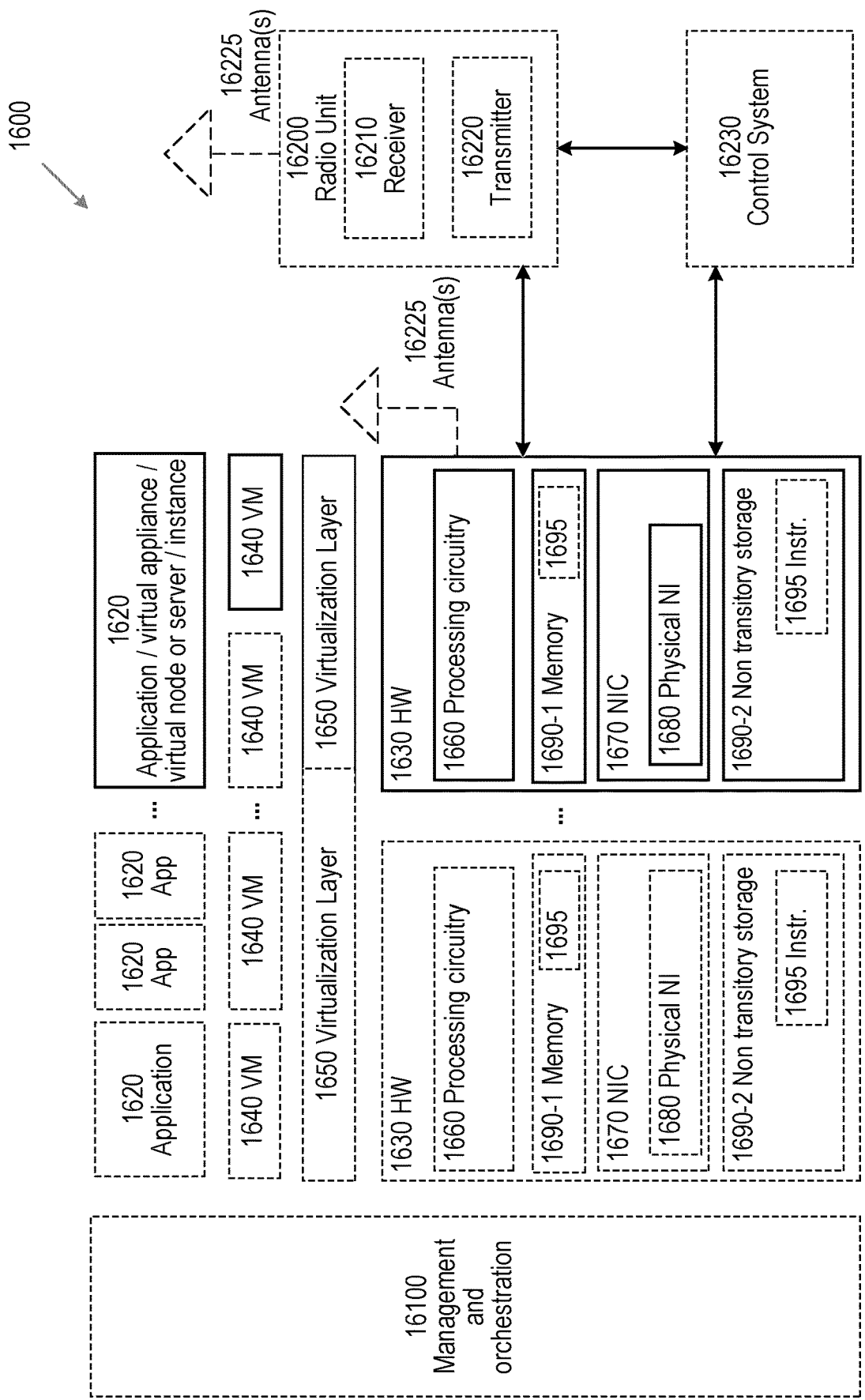
FIG. 16 is a block diagram illustrating a network environment that can facilitate virtualization of various functions implemented according to various exemplary embodiments of the present disclosure.

FIG. 16 is a schematic block diagram illustrating a virtualization environment 1600 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station or a virtualized radio access node) or to a device (e.g., a UE, such as any UE described herein including but not limited to the first UE and/or second UE referred to herein, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 1600 hosted by one or more of hardware nodes 1630. Further, in embodiments in which the virtual node is not a radio access node or does not require radio connectivity (e.g., a core network node), then the network node can be entirely virtualized.

The functions can be implemented by one or more applications 1620 (which can alternatively be called software instances, virtual appliances, network functions, virtual nodes, virtual network functions, etc.) operative to implement some of the features, functions, and/or benefits of some of the embodiments disclosed herein. Applications 1620 are run in virtualization environment 1600 which provides hardware 1630 comprising processing circuitry 1660 and memory 1690. Memory 1690 contains instructions 1695 executable by processing circuitry 1660 whereby application 1620 is operative to provide one or more of the features, benefits, and/or functions disclosed herein.

Virtualization environment 1600 can include general-purpose or special-purpose network hardware devices 1630 comprising a set of one or more processors or processing circuitry 1660, which can be commercial off-the-shelf (COTS) processors, dedicated Application Specific Integrated Circuits (ASICs), or any other type of processing circuitry including digital or analog hardware components or special purpose processors. Each hardware device can comprise memory 1690-1 which can be non-persistent memory for temporarily storing instructions 1695 or software executed by processing circuitry 1660. For example, instructions 1695 can include program instructions (also referred to as a computer program product) that, when executed by processing circuitry 1660, can configure hardware node 1620 to perform operations corresponding to various exemplary methods (e.g., procedures) described herein. Such operations can also be attributed to virtual node(s) 1620 that is/are hosted by hardware node 1630.

Each hardware device can comprise one or more network interface controllers (NICs) 1670, also known as network interface cards, which include physical network interface 1680. Each hardware device can also include non-transitory, persistent, machine-readable storage media 1690-2 having stored therein software 1695 and/or instructions executable by processing circuitry 1660. Software 1695 can include any type of software including software for instantiating one or more virtualization layers 1650 (also referred to as hypervisors), software to execute virtual machines 1640 as well as software allowing it to execute functions, features and/or benefits described in relation with some embodiments described herein.

Virtual machines 1640, comprise virtual processing, virtual memory, virtual networking or interface and virtual storage, and can be run by a corresponding virtualization layer 1650 or hypervisor. Different embodiments of the instance of virtual appliance 1620 can be implemented on one or more of virtual machines 1640, and the implementations can be made in different ways.

During operation, processing circuitry 1660 executes software 1695 to instantiate the hypervisor or virtualization layer 1650, which can sometimes be referred to as a virtual machine monitor (VMM). Virtualization layer 1650 can present a virtual operating platform that appears like networking hardware to virtual machine 1640.

As shown in FIG. 16, hardware 1630 can be a standalone network node with generic or specific components. Hardware 1630 can comprise antenna 16225 and can implement some functions via virtualization. Alternatively, hardware 1630 can be part of a larger cluster of hardware (e.g., such as in a data center or customer premise equipment (CPE)) where many hardware nodes work together and are managed via management and orchestration (MANO) 16100, which, among others, oversees lifecycle management of applications 1620.

Virtualization of the hardware is in some contexts referred to as network function virtualization (NFV). NFV can be used to consolidate many network equipment types onto industry standard high volume server hardware, physical switches, and physical storage, which can be located in data centers, and customer premise equipment.

In the context of NFV, virtual machine 1640 can be a software implementation of a physical machine that runs programs as if they were executing on a physical, non-virtualized machine. Each of virtual machines 1640, and that part of hardware 1630 that executes that virtual machine, be it hardware dedicated to that virtual machine and/or hardware shared by that virtual machine with others of the virtual machines 1640, forms a separate virtual network elements (VNE).

Still in the context of NFV, a Virtual Network Function (VNF) is responsible for handling specific network functions that run in one or more virtual machines 1640 on top of hardware networking infrastructure 1630 and corresponds to application 1620 in FIG. 16.

In some embodiments, one or more radio units 16200 that each include one or more transmitters 16220 and one or more receivers 16210 can be coupled to one or more antennas 16225. Radio units 16200 can communicate directly with hardware nodes 1630 via one or more appropriate network interfaces and can be used in combination with the virtual components to provide a virtual node with radio capabilities, such as a radio access node or a base station. In some embodiments, some signalling can be effected with the use of control system 16230 which can alternatively be used for communication between the hardware nodes 1630 and radio units 16200.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution by processing circuitry (e.g., one or more processors). Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Furthermore, functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

As used herein unless expressly stated to the contrary, the phrases "at least one of" and "one or more of," followed by a conjunctive list of enumerated items (e.g., "A and B", "A, B, and C"), are intended to mean "at least one item, with each item selected from the list consisting of" the enumerated items. For example, "at least one of A and B" is intended to mean any of the following: A; B; A and B. Likewise, "one or more of A, B, and C" is intended to mean any of the following: A; B; C; A and B; B and C; A and C; A, B, and C.

As used herein unless expressly stated to the contrary, the phrase "a plurality of" followed by a conjunctive list of enumerated items (e.g., "A and B", "A, B, and C") is intended to mean "multiple items, with each item selected from the list consisting of" the enumerated items. For example, "a plurality of A and B" is intended to mean any of the following: more than one A; more than one B; or at least one A and at least one B.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

Exemplary embodiments of the present disclosure include, but are not limited to, the following enumerated embodiments.

1. A method performed by a first user equipment, UE, configured for device-to-device, D2D, wireless communication, the method comprising:
    starting (1225) a keep-alive timer associated with a unicast sidelink (SL) connection with a second UE configured for D2D wireless communication;
    in response to expiration of the keep-alive timer without receiving a transmission from the second UE while the keep-alive timer was running, transmitting (1235) a keep-alive message to the second UE; and
    in response to not receiving an acknowledgement, of the keep-alive message, from the second UE within a predetermined duration, initiating release (1255) of the unicast SL connection with the second UE without transmitting a further keep-alive message to the second UE.
2. The method of embodiment 1, further comprising receiving (1220) a first transmission from the second UE via the unicast SL connection, wherein the keep-alive timer is started in response to receiving the first transmission.
3. The method of embodiment 3, wherein the first transmission is one or more of the following:
    a PC5 signaling message,
    user data on physical sidelink shared channel (PSSCH),
    sidelink control information (SCI) on physical sidelink control channel (PSCCH),
    ACK or NACK hybrid ARQ (HARQ) feedback on PHY and/or MAC layers, and
    ACK or NACK feedback on an RLC layer.
4. The method of any of embodiments 1-3, wherein:
    the method further comprises, in response to transmitting the keep-alive message to the second UE, starting (1240) a release timer associated with the unicast SL connection; and
    the predetermined duration is upon expiration of the release timer.
5. The method of embodiment 4, wherein:
    the method further comprises determining (1215) one or more timer values based on one or more services running over the unicast SL connection; and
    each determined timer value is applied when starting the keep-alive timer or the release timer.
6. The method of any of embodiments 4-5, further comprising, in response to a radio link failure (RLF) condition while at least one of the keep-alive timer and the release timer is running, stopping (1245) said at least one timer and initiating release of the unicast SL connection.
7. The method of any of embodiments 4-6, further comprising restarting (1230) the keep-alive timer in response to receiving a second transmission, from the second UE, while the keep-alive timer was running.
8. The method of any of embodiments 4-7, further comprising stopping (1245) the release timer and restarting the keep-alive timer in response to receiving a second transmission, from the second UE, while the release timer was running.
9. The method of any of embodiments 7-8, wherein the second transmission is one or more of the following:
    a PC5 signaling message,
    user data on physical sidelink shared channel (PSSCH),
    sidelink control information (SCI) on physical sidelink control channel (PSCCH),
    ACK or NACK hybrid ARQ (HARQ) feedback on PHY and/or MAC layers, and
    ACK or NACK feedback on an RLC layer.
10. The method of any of embodiments 1-9, further comprising releasing (1260) the unicast SL connection with the second UE without transmitting a connection release message to the second UE.
11. The method of any of embodiments 1-10, further comprising sending (1210), to the second UE, a configuration message comprising an indicator of whether the second UE is expected to respond to a keep-alive message, from the first UE, with an acknowledgement.
12. A method performed by a second user equipment, UE, configured for device-to-device, D2D, wireless communication, the method comprising:
    receiving (1330), from a first UE configured for D2D wireless communication, a keep-alive message for a unicast sidelink (SL) connection between the first UE and the second UE; and
    selectively transmitting (1350), to the first UE, an acknowledgement of the keep-alive message, wherein the selective transmission is based on one or more of the following:
    the second UE's need for monitoring the unicast SL connection;
    channel conditions relating to the unicast SL connection; and
    whether the first UE expects an acknowledgement of the keep-alive message.
13. The method of embodiment 12, further comprising receiving (1310), from the first UE, a configuration message comprising an indicator of whether the second UE is expected to respond to a keep-alive message, from the first UE, with an acknowledgement.
14. The method of any of embodiments 12-13, wherein:
    the method further comprises receiving (1360), from the first UE, connection release message; and
    the connection release message is received without receiving a further keep-alive message from the first UE.

15. The method of any of embodiments 12-14,
the method further comprises, before receiving the keep-alive message, transmitting (1320) a first transmission to the first UE via the unicast SL connection; and
the first transmission is one or more of the following:
a PC5 signaling message,
user data on physical sidelink shared channel (PSSCH),
sidelink control information (SCI) on physical sidelink control channel (PSCCH),
ACK or NACK hybrid ARQ (HARQ) feedback on PHY and/or MAC layers, and
ACK or NACK feedback on an RLC layer.

16. The method of any of embodiments 12-15,
the method further comprises, after receiving the keep-alive message, transmitting (1340) a second transmission to the first UE via the unicast SL connection; and
the second transmission is one or more of the following:
a PC5 signaling message,
user data on physical sidelink shared channel (PSSCH),
sidelink control information (SCI) on physical sidelink control channel (PSCCH),
ACK or NACK hybrid ARQ (HARQ) feedback on PHY and/or MAC layers, and
ACK or NACK feedback on an RLC layer.

17. A user equipment, UE (1410, 1500) configured for device-to-device, D2D, wireless communication, the UE comprising:
radio interface circuitry (1414, 1509) configured to communicate with at least one other UE; and
processing circuitry (1420, 1501) operably coupled with the radio interface circuitry, whereby the processing circuitry and the radio interface circuitry are configured to perform operations corresponding to any of the methods of embodiments 1-16.

18. A user equipment, UE (1410, 1500) configured for device-to-device, D2D, wireless communication, the UE being further arranged to perform operations corresponding to any of the methods of embodiments 1-16.

19. A non-transitory, computer-readable medium (1430, 1521) storing computer-executable instructions that, when executed by processing circuitry (1460, 1501) of a user equipment, UE (1410, 1500) configured for device-to-device, D2D, wireless communication, configure the UE to perform operations corresponding to any of the methods of embodiments 1-16.

20. A computer program product (1525) comprising computer-executable instructions that, when executed by processing circuitry (1460, 1501) of a user equipment, UE (1410, 1500) configured for device-to-device, D2D, wireless communication, configure the UE to perform operations corresponding to any of the methods of embodiments 1-16.

The invention claimed is:

1. A method performed by a first user equipment, UE, for device-to-device, D2D, wireless communication, the method comprising:
starting a keep-alive timer associated with a unicast sidelink, SL, connection with a second UE configured for D2D wireless communication;
in response to expiration of the keep-alive timer, without receiving a transmission from the second UE while the keep-alive timer was running, transmitting a keep-alive message to the second UE; and
in response to not receiving an acknowledgement of the keep-alive message, from the second UE within a predetermined duration, initiating release of the unicast SL connection with the second UE without transmitting a further keep-alive message to the second UE; and
in response to a radio link failure (RLF) condition while at least one of the keep-alive timer and a release timer is running:
stopping at least one of the keep-alive timer and the release timer; and
initiating release of the unicast SL connection.

2. The method of claim 1, further comprising:
receiving a first transmission from the second UE via the unicast SL connection, wherein the keep-alive timer is started in response to receiving the first transmission.

3. The method of claim 1, wherein the first transmission is one or more of the following:
a PC5 signaling message;
user data on physical sidelink shared channel, PSSCH;
sidelink control information, SCI, on physical sidelink control channel, PSCCH;
acknowledgement or negative acknowledgement hybrid automatic repeat request feedback on one of physical, PHY, and media access control, MAC, layers; and
acknowledgement or negative acknowledgement feedback on a radio link control, RLC, layer.

4. The method of claim 1, further comprising:
in response to transmitting the keep-alive message to the second UE, starting the release timer, the release timer being associated with the unicast SL connection, wherein the predetermined duration is upon expiration of the release timer.

5. The method of claim 4, further comprising:
determining one or more timer values based on one or more services running over the unicast SL connection, wherein each determined timer value is applied when starting the keep-alive timer or the release timer.

6. The method of claim 4, further comprising:
restarting the keep-alive timer in response to receiving a second transmission, from the second UE, while the keep-alive timer was running.

7. The method of claim 4, further comprising:
stopping the release timer and restarting the keep-alive timer in response to receiving a second transmission, from the second UE, while the release timer was running.

8. The method of claim 6, wherein the second transmission is one or more of the following:
a PC5 signaling message;
user data on physical sidelink shared channel, PSSCH;
sidelink control information, SCI, on physical sidelink control channel, PSCCH;
acknowledgement or negative acknowledgement hybrid automatic repeat request feedback on one of physical, PHY, and media access control, MAC, layers; and
acknowledgement or negative acknowledgement feedback on a radio link control, RLC, layer.

9. The method of claim 1, further comprising:
releasing the unicast SL connection with the second UE without transmitting a connection release message to the second UE.

10. A first user equipment, UE configured for device-to-device, D2D, wireless communication, the UE comprising:
radio interface circuitry configured to communicate with at least one other UE; and processing circuitry operably coupled with the radio interface circuitry, whereby the processing circuitry and the radio interface circuitry are configured to:
- start a keep-alive timer associated with a unicast sidelink, SL, connection with a second UE configured for D2D wireless communication;
- in response to expiration of the keep-alive timer, without receiving a transmission from the second UE while the keep-alive timer was running, transmit a keep-alive message to the second UE;
- in response to not receiving an acknowledgement of the keep-alive message, from the second UE within a predetermined duration, initiate release of the unicast SL connection with the second UE without transmitting a further keep-alive message to the second UE; and
- in response to a radio link failure (RLF) condition while at least one of the keep-alive timer and a release timer is running:
  - stop at least one of the keep-alive timer and the release timer; and
  - initiate release of the unicast SL connection.

11. The method of claim 2, further comprising:
in response to transmitting the keep-alive message to the second UE, starting the release timer, the release timer being associated with the unicast SL connection, wherein the predetermined duration is upon expiration of the release timer.

12. The method of claim 2, further comprising:
releasing the unicast SL connection with the second UE without transmitting a connection release message to the second UE.

13. The method of claim 3, further comprising:
in response to transmitting the keep-alive message to the second UE, starting the release timer, the release timer being associated with the unicast SL connection, wherein the predetermined duration is upon expiration of the release timer.

14. The method of claim 3, further comprising:
releasing the unicast SL connection with the second UE without transmitting a connection release message to the second UE.

15. The method of claim 5, further comprising:
restarting the keep-alive timer in response to receiving a second transmission, from the second UE, while the keep-alive timer was running.

16. The method of claim 7, wherein the second transmission is one or more of the following:
- a PC5 signaling message;
- user data on physical sidelink shared channel, PSSCH;
- sidelink control information, SCI, on physical sidelink control channel, PSCCH;
- acknowledgement or negative acknowledgement hybrid automatic repeat request feedback on one of physical, PHY, and media access control, MAC, layers; and
- acknowledgement or negative acknowledgement feedback on a radio link control, RLC, layer.

* * * * *